US012519198B2

(12) United States Patent
Kawaguchi

(10) Patent No.: US 12,519,198 B2

(45) Date of Patent: Jan. 6, 2026

(54) HIGH-FREQUENCY CIRCUIT DEFINED BY FIRST AND SECOND CONDUCTIVE LAYERS CONNECTED BY CONDUCTIVE MEMBERS AND COUPLED TO A THIRD REGION OF A SPECIFIED CONFIGURATION

(71) Applicant: KABUSHIKI KAISHA TOSHIBA, Tokyo (JP)

(72) Inventor: Tamio Kawaguchi, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 283 days.

(21) Appl. No.: 18/356,613

(22) Filed: Jul. 21, 2023

(65) Prior Publication Data

US 2024/0222835 A1 Jul. 4, 2024

(30) Foreign Application Priority Data

Jan. 4, 2023 (JP) ................................ 2023-000141

(51) Int. Cl.
*H01P 3/12* (2006.01)
*H01P 5/107* (2006.01)

(52) U.S. Cl.
CPC .............. *H01P 3/121* (2013.01); *H01P 3/122* (2013.01); *H01P 5/107* (2013.01)

(58) Field of Classification Search
CPC ......... H01P 3/121; H01P 5/107; H01P 1/2088
USPC .................................................... 333/239, 26
See application file for complete search history.

(56) References Cited

U.S. PATENT DOCUMENTS 7,808,439 B2 * 10/2010 Yang et al. ............ H01Q 13/22 343/770
9,537,199 B2 * 1/2017 Dang et al. ............... H01P 3/16
2004/0251992 A1 * 12/2004 Kim et al. .............. H01P 3/122 333/208

FOREIGN PATENT DOCUMENTS

JP 2004015404 A 1/2004
JP 5669043 B2 12/2014

OTHER PUBLICATIONS

Deslandes, et al., "Integrated Microstrip and Rectangular Waveguide in Planar Form", IEEE Microwave and Wireless Components Letters, vol. 11, No. 2, pp. 68-70, Feb. 2001.

* cited by examiner

*Primary Examiner* — Benny T Lee

(74) *Attorney, Agent, or Firm* — Holtz, Holtz & Volek PC

(57) ABSTRACT

According to one embodiment, a high-frequency circuit includes a first conductive layer, second conductive layer, a plurality of first conductive members, a plurality of second conductive members, a third conductive member, and a fourth conductive member. The second conductive layer includes a first region, a second region, and a third region between the first region and the second region. The third region includes a first side portion and a second side portion. A direction from the first side portion to the second side portion is along the third direction. A first angle between the first side portion and the second direction is different from a second angle between the second side portion and the second direction.

20 Claims, 12 Drawing Sheets

HIGH-FREQUENCY CIRCUIT DEFINED BY FIRST AND SECOND CONDUCTIVE LAYERS CONNECTED BY CONDUCTIVE MEMBERS AND COUPLED TO A THIRD REGION OF A SPECIFIED CONFIGURATION

CROSS-REFERENCE TO RELATED APPLICATIONS

This application is based upon and claims the benefit of priority from Japanese Patent Application No. 2023-000141, filed on Jan. 4, 2023; the entire contents of which are incorporated herein by reference.

FIELD

Embodiments of the invention generally relate to a high-frequency circuit.

BACKGROUND

For example, it is desired to improve the characteristics of high-frequency circuits including a waveguide circuit.

DETAILED DESCRIPTION OF THE INVENTION

Figure 1:
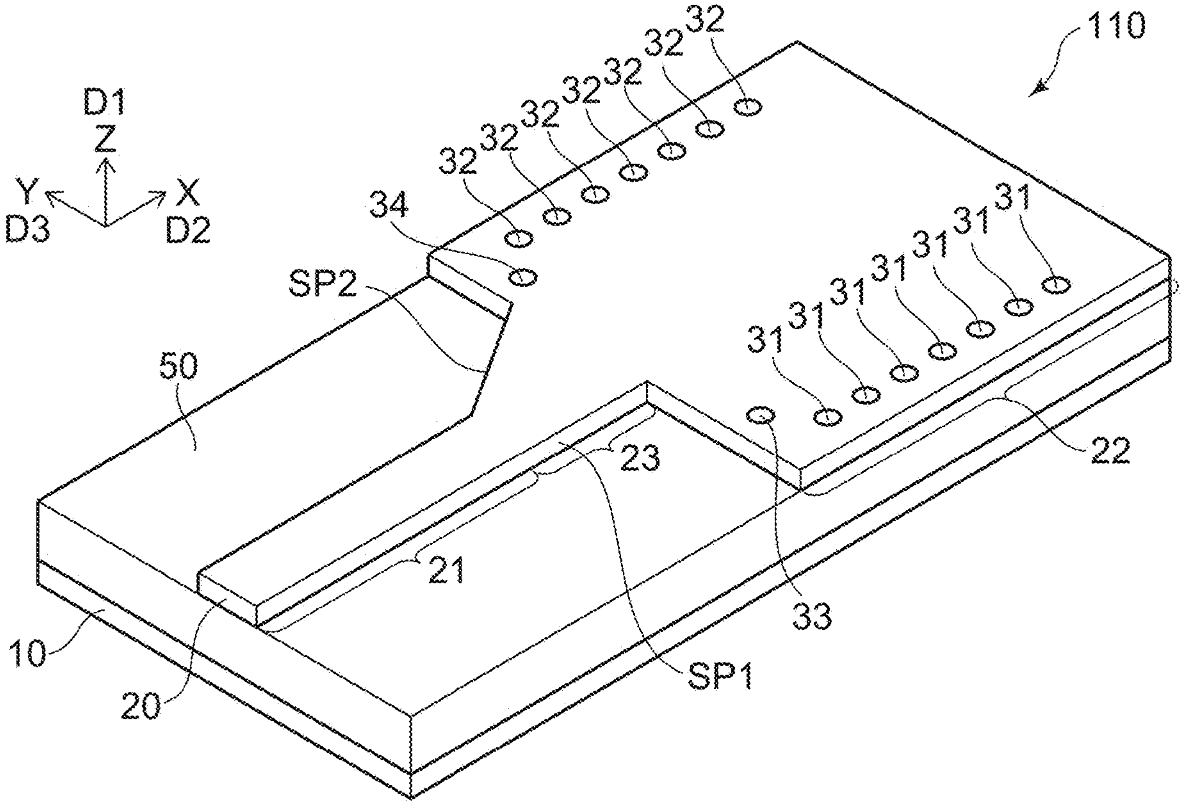
FIG. 1 is a schematic perspective view illustrating a high-frequency circuit according to a first embodiment.

According to one embodiment, a high-frequency circuit includes a first conductive layer, second conductive layer, a plurality of first conductive members, a plurality of second conductive members, a third conductive member, and a fourth conductive member. The second conductive layer includes a first region, a second region, and a third region between the first region and the second region. A second direction from the first region to the second region crosses a first direction from the first conductive layer to the second conductive layer. The first region extends along the second direction. A second region length along a third direction of the second region is longer than a first region length along the third direction of the first region. The third direction crosses a plane including the first direction and the second direction. The third region includes a first portion and a second portion. The first portion is connected to the first region. The second portion is connected to the second region. A third region length along the third direction of the second portion is between the first region length and the second region length. The plurality of first conductive members are arranged along the second direction. The plurality of first conductive members are connected to the first conductive layer and the second region. The plurality of second conductive members are arranged along the second direction. The plurality of second conductive members are connected to the first conductive layer and the second region. The plurality of second conductive members are separated from the plurality of first conductive members in the third direction. The third conductive member is connected to the first conductive layer and the second region. A position of the third conductive member in the second direction is between a position of the third region in the second direction and a position of the plurality of first conductive members in the second direction. The fourth conductive member is connected to the first conductive layer and the second region. A position of the fourth conductive member in the second direction being between the position of the third region in the second direction and a position of the plurality of second conductive members in the second direction, the fourth conductive member is separated from the third conductive member in the third direction. A first distance in the third direction between a third center in the third direction of the third conductive member and a fourth center in the third direction of the fourth conductive member is shorter than a second distance in the third direction between a first center in the third direction of one of the plurality of first conductive members and a second center in the third direction of one of the plurality of second conductive members. The third region includes a first side portion and a second side portion. A direction from the first side portion to the second side portion is along the third direction. A first angle between the first side portion and the second direction is different from a second angle between the second side portion and the second direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing, and the description thereof, are marked with like reference numerals, and a detailed description is omitted as appropriate.

First Embodiment

FIG. 1 is a schematic perspective view illustrating a high-frequency circuit according to a first embodiment.

Figure 2:
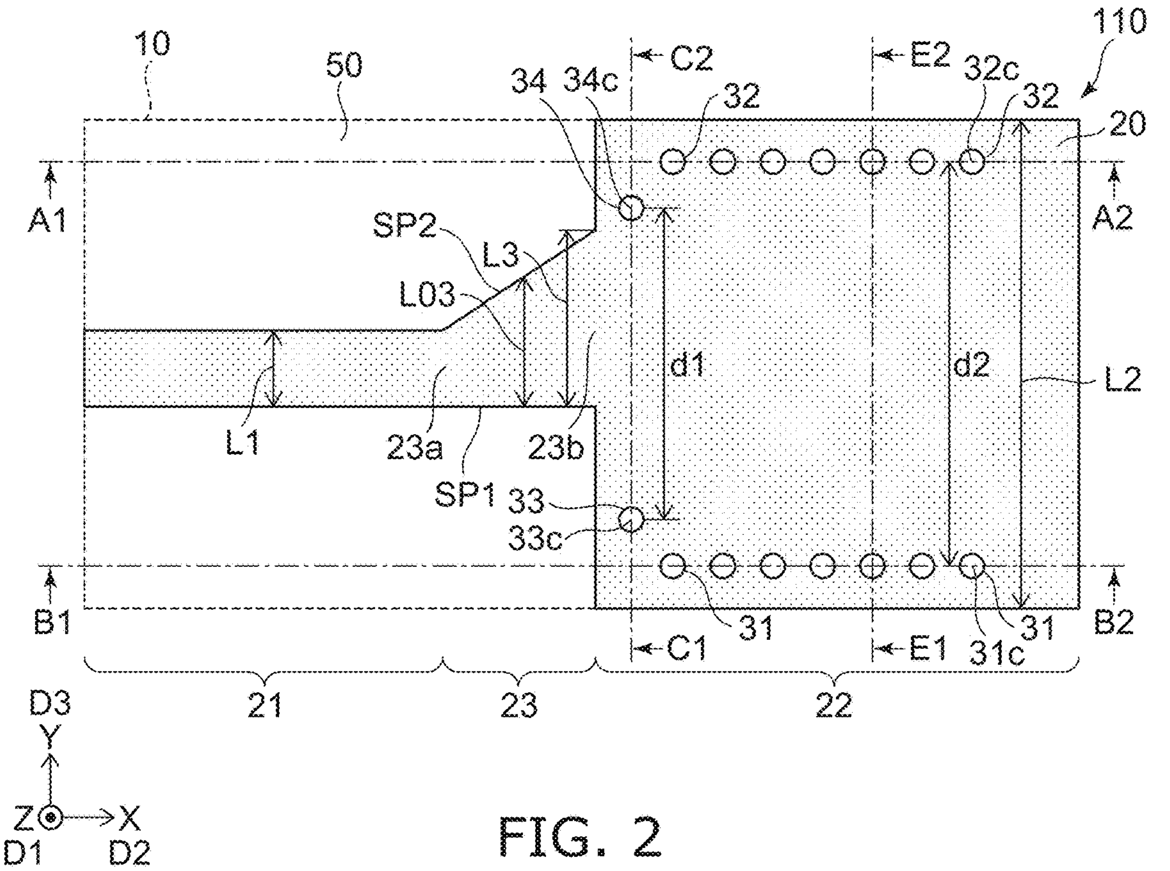
FIG. 2 is a schematic plan view illustrating the high-frequency circuit according to the first embodiment.
Figure 3:
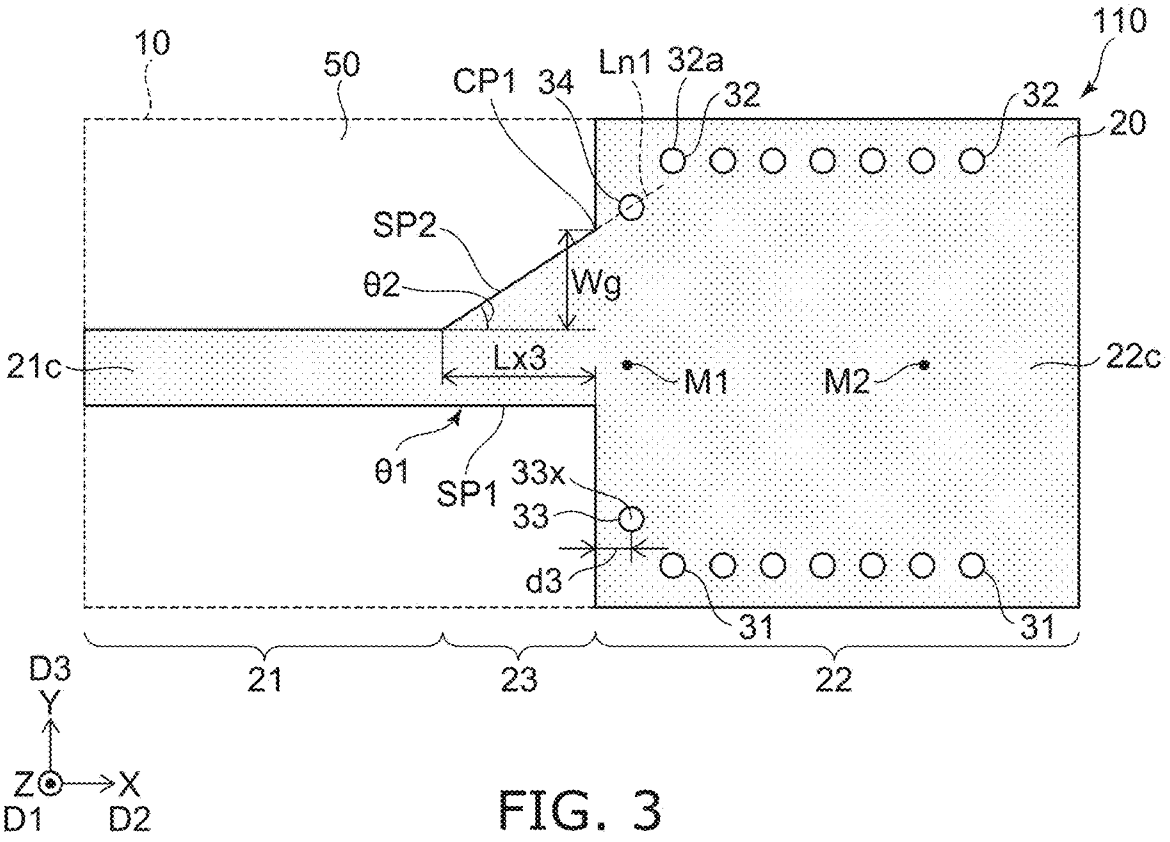
FIG. 3 is a schematic plan view illustrating the high-frequency circuit according to the first embodiment.

FIGS. 2 and 3 are schematic plan views illustrating the high-frequency circuit according to the first embodiment.

FIGS. 4A to 4D are schematic cross-sectional views illustrating the high-frequency circuit according to the first embodiment.

Figure 4A:
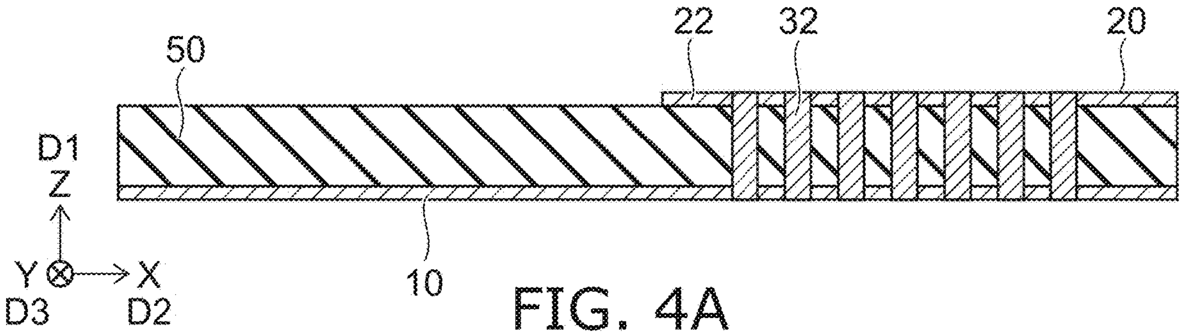
FIGS. 4A to 4D are schematic cross-sectional views illustrating the high-frequency circuit according to the first embodiment.
Figure 4B:
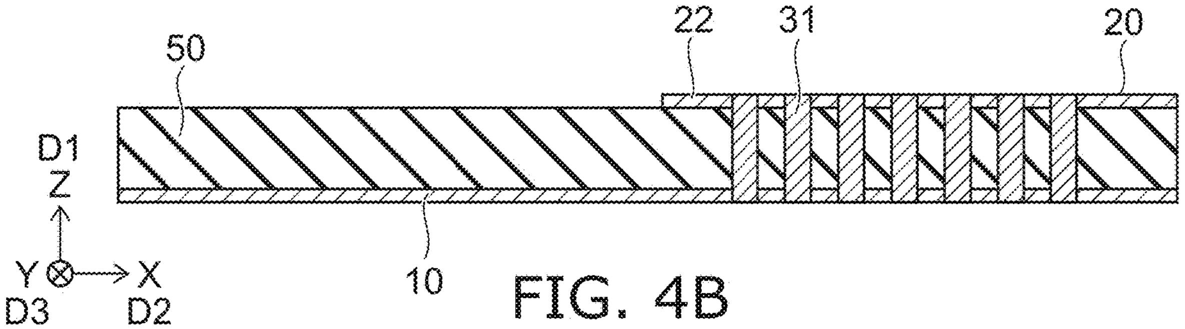
Figure 4C:
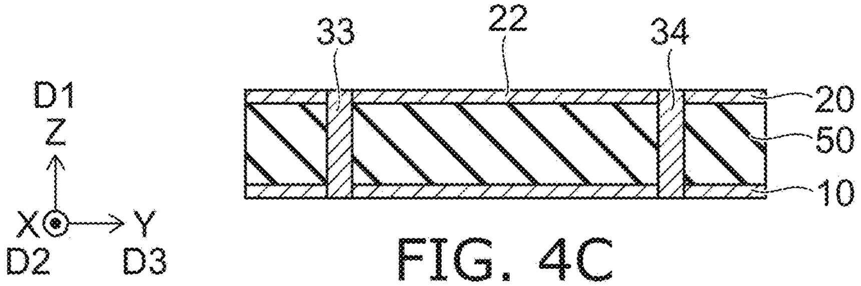
Figure 4D:
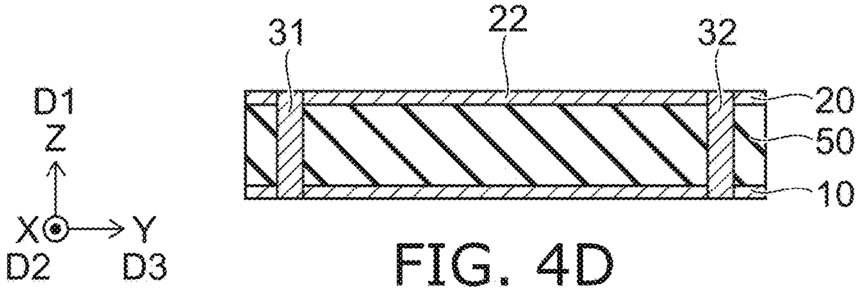

FIG. 4A is a cross-sectional view taken along the line A1-A2 of FIG. 2. FIG. 4B is a cross-sectional view taken along the line B1-B2 of FIG. 2. FIG. 4C is a cross-sectional view taken along the line C1-C2 of FIG. 2. FIG. 4D is a sectional view taken along the line E1-E2 of FIG. 2.

As shown in FIG. 1, a high-frequency circuit 110 according to the embodiment includes a first conductive layer 10, a second conductive layer 20, a plurality of first conductive members 31, a plurality of second conductive members 32, a third conductive member 33, and a fourth conductive member 34.

A first direction D1 from the first conductive layer 10 to the second conductive layer 20 is defined as a Z-axis direction. One direction perpendicular to the Z-axis direction is defined as an X-axis direction. A direction perpendicular to the Z-axis direction and the X-axis direction is defined as a Y-axis direction. The first conductive layer 10 and the second conductive layer 20 extend along the X-Y plane.

The second conductive layer 20 includes a first region 21, a second region 22 and a third region 23. The third region 23 is provided between the first region 21 and the second region 22. A second direction D2 from the first region 21 to the second region 22 crosses the first direction D1. The second direction D2 is, for example, the X-axis direction.

The first region 21 extends along the second direction D2. Two sides included in the first region 21 are along the second direction D2. A direction from one of the two sides to the other one of the two sides is along the Y-axis direction.

As shown in FIG. 2, a second region length L2 of the second region 22 along a third direction D3 is longer than a first region length L1 of the first region 21 along the third direction D3. The third direction D3 crosses a plane including the first direction D1 and the second direction D2. The third direction D3 is, for example, the Y-axis direction.

The third region 23 includes a first portion 23*a* and a second portion 23*b*. The first portion 23*a* is connected to the first region 21. The second portion 23*b* is connected to the second region 22. A third region length L3 along the third direction D3 of the second portion 23*b* is between the first region length L1 and the second region length L2.

As shown in FIG. 2, a length L03 of the third region 23 along the third direction D3 monotonously increases in the direction from the first region 21 to the second region 22. In this example, the length L03 increases linearly in the direction from the first region 21 to the second region 22. A region wider than the first region 21 corresponds to the third region 23. A region whose width changes corresponds to the third region 23.

As shown in FIGS. 1 and 2, the plurality of first conductive members 31 are arranged along the second direction D2. As shown in FIGS. 4B and 4D, the plurality of first conductive members 31 are connected to the first conductive layer 10 and the second region 22.

As shown in FIGS. 1 and 2, the plurality of second conductive members 32 are arranged along the second direction D2. The plurality of second conductive members 32 are separated from the plurality of first conductive members 31 in the third direction D3. As shown in FIGS. 4A and 4D, the plurality of second conductive members 32 are connected to the first conductive layer 10 and the second region 22.

As shown in FIG. 4C, the third conductive member 33 is connected to the first conductive layer 10 and the second region 22. As shown in FIG. 2, the position of the third conductive member 33 in the second direction D2 is between the position of the third region 23 in the second direction D2 and the position of the plurality of first conductive members 31 in the second direction D2.

As shown in FIG. 4C, the fourth conductive member 34 is connected to the first conductive layer 10 and the second region 22. As shown in FIG. 2, the position of the fourth conductive member 34 in the second direction D2 is between the position of the third region 23 in the second direction D2 and the position of the plurality of second conductive members 32 in the second direction D2. The fourth conductive member 34 is separated from the third conductive member 33 in the third direction D3.

As shown in FIG. 2, a distance in the third direction D3 between a third center 33*c* in the third direction D3 of the third conductive member 33 and a fourth center 34*c* in the third direction D3 of the fourth conductive member 34 is defined as a first distance d1. A distance in the third direction D3 between a first center 31*c* in the third direction D3 of one of the plurality of first conductive members 31 and a second center 32*c* in the third direction D3 of one of the plurality of second conductive members 32 is defined as a second distance d2. The first distance d1 is shorter than the second distance d2.

The first region 21 is, for example, a microstrip line. The second region 22, the first conductive layer 10, the plurality of first conductive members 31 and the plurality of second conductive members 32 are, for example, a post-wall waveguide. The third region 23 is, for example, a conversion circuit between the microstrip line and the post wall waveguide.

For example, a high-frequency signal is input to the edge of the first region 21. The input high-frequency signal passes through the second region 22 via the third region 23.

As shown in FIGS. 2 and 3, in the high-frequency circuit 110, the third region 23 includes a first side portion SP1 and a second side portion SP2. A direction from the first side portion SP1 to the second side portion SP2 is along the third direction D3. One end of first side portion SP1 is connected to first region 21. Another end of the first side portion SP1 is connected to the second region 22. One end of the second side portion SP2 is connected to the first region 21. Another end of the second side portion SP2 is connected to the second region 22.

As shown in FIG. 3, a first angle θ1 between the first side portion SP1 and the second direction D2 is different from a second angle θ2 between the second side portion SP2 and the second direction D2.

In this example, the first angle θ1 is substantially 0 degrees. In the embodiment, the absolute value of the first angle θ1 may be not less than 0 degrees and not more than 10 degrees. For example, the first side portion SP1 extends along the second direction D2. The first side portion SP1 may be parallel to the sides of the first region 21.

On the other hand, the second angle θ2 exceeds 10 degrees. A difference between the first angle θ1 and the second angle θ2 is 10 degrees or more. Thus, in the embodiment, the planar shape of the third region 23 is asymmetric with respect to the second direction D2.

As described above, in the embodiments, the third conductive member 33 and the fourth conductive member 34 are provided. Furthermore, the first angle θ1 is different from the second angle θ2. As a result, it has been found that, for example, a high-frequency signal input to the first region 21 propagates to the second region 22 via the third region 23 with high efficiency.

In the embodiment, it has been found that reflection in propagation can be reduced even when the length of the third region 23 in the X-axis direction is shortened compared with a case where the third conductive member 33 and the fourth conductive member 34 are not provided, for example. The reflection can be more effectively reduced by an asymmetrical shape in which the first angle θ1 is different from the second angle θ2. Examples of the characteristics of the high-frequency circuit 110 will be described later.

As shown in FIG. 3, a length of the third region 23 along the second direction D2 is defined as a length Lx3. The length Lx3 is preferably not less than 0.4 times and not more than 0.6 times the first distance d1. The reflection can be suppressed.

As shown in FIGS. 2 and 3, a difference between the third region length L3 (FIG. 2) and the first region length L1 (FIG. 2) is defined as a length Wg (FIG. 3). The length Wg (difference) is preferably not less than 0.4 times and not more than 0.6 times the first distance d1 (FIG. 2). The reflection can be suppressed.

As described above, the second region 22, the first conductive layer 10, the plurality of first conductive members 31 and the plurality of second conductive members 32 function, for example, as the post-wall waveguide. For example, the first conductive layer 10, the second region 22, the plurality of first conductive members 31, and the plurality of second conductive members 32 operate as a waveguide for propagating a signal with the first wavelength λg. The first wavelength λg is the guide wavelength of the waveguide. For example, Er is the relative dielectric constant of the waveguide. For example, the wavelength (For example, wavelength in free space (e.g., in air)) of the signal input to the first region 21 of the high-frequency circuit 110 corresponds to the product of the first wavelength λg and $(\varepsilon r)^{1/2}$. The relative permittivity of the waveguide corresponds to the relative permittivity of the insulating member 50 described later.

For example, the first distance d1 is not less than 0.4 times and not more than 0.6 times the first wavelength λg. For example, the first distance d1 may be substantially λg/2.

For example, the length Lx3 (FIG. 3) along the second direction D2 of the third region 23 may be substantially λg/4. For example, the length Wg may be substantially λg/4.

As shown in FIG. 3, a distance in the second direction D2 between the third region 23 and the position of the center 33*x* in the second direction D2 of the third conductive member 33 in the second direction D2 is defined as a third distance d3. The third distance d3 is preferably, for example, not less than 0 times and not more than 1/10 times the first distance d1. The reflection is suppressed. The third distance d3 is preferably not less than 0 and not more than λ/20.

In the embodiment, the first wavelength λg is, for example, not less than 19 mm and not more than 22 mm. The first wavelength λg may be, for example, 15 mm or less.

The interval between the plurality of first conductive members 31 may be, for example, ¼ or less the first distance d1. It is preferable that the interval between the plurality of first conductive members 31 is as small as possible. The interval between the plurality of first conductive members 31 may be, for example, λg/8 or less. The interval between the plurality of second conductive members 32 may be, for example, ¼ or less of the first distance d1. It is preferable that the interval between the plurality of second conductive members 32 is as small as possible. The interval between the plurality of second conductive members 32 may be, for example, λg/8 or less. Signal leakage is suppressed. Good propagation characteristics are obtained.

As shown in FIG. 3, for example, the fourth conductive member 34 is on a straight line Ln1 passing through the second side portion SP2 and along the second side portion SP2. For example, the straight line Ln1 passing through the second side portion SP2 and along the second side portion SP2 passes through the fourth conductive member 34. The reflections are suppressed. Good properties are obtained.

As shown in FIG. 3, for example, one second conductive member 32*a* of the plurality of second conductive members 32 is closest to the third region 23 among the plurality of second conductive members 32. For example, the fourth conductive member 34 may be provided between a connection point CP1 between the second side portion SP2 and the second region 22 and the one 32*s* of the plurality of second conductive members 32. At this time, the reflection is suppressed. Good characteristics are obtained.

As shown in FIG. 3, a direction from the first region center 21*c* in the third direction D3 of the first region 21 to the second region center 22*c* in the third direction D3 of the second region 22 is along the second direction D2.

As shown in FIG. 3, a midpoint in the third direction D3 between the third conductive member 33 and the fourth conductive member 34 is defined as a first midpoint M1. A midpoint in the third direction D3 between the plurality of first conductive members 31 and the plurality of second conductive members 32 is defined as a second midpoint M2. A direction from the first midpoint M1 to the second midpoint M2 is along the second direction D2.

As shown in FIG. 1, the high-frequency circuit 110 may include an insulating member 50. The insulating member 50 is provided between the first conductive layer 10 and the second conductive layer 20. As shown in FIGS. 1, 4A, 4B and 4D, the insulating member 50 is provided around the plurality of first conductive members 31 and the plurality of second conductive members 32 in the second direction D2 and the third direction D3. As shown in FIG. 4C, the insulating member 50 is provided around the third conductive member 33 and the fourth conductive member 34 in the second direction D2 and the third direction D3. These conductive members pass through the insulating member 50 along the first direction D1.

The insulating member 50 is a dielectric layer. The insulating member 50 may include, for example, at least one selected from the group consisting of silicon and aluminum, and at least one selected from the group consisting of oxygen and nitrogen. The insulating member 50 may include sapphire. The insulating member 50 may include aluminum oxide or the like. The insulating member 50 may include ceramic. The insulating member 50 may include fluororesin (e.g., polytetrafluoroethylene). The insulating member 50 may include quartz. The insulating member 50 may include glass cloth or the like. The thickness of the insulating member 50 in the first direction D1 is, for example, not less than 0.2 mm and not more than 5 mm (e.g., approximately 0.5 mm).

At least one of the first conductive layer 10 or the second conductive layer 20 may include at least one selected from the group consisting of copper, gold and aluminum. At least one of the plurality of first conductive members 31, the plurality of second conductive members 32, the third conductive member 33, and the fourth conductive member 34 may include at least one selected from the group consisting of copper and gold. The conductive member may be formed by plating or the like, for example.

Figure 5:
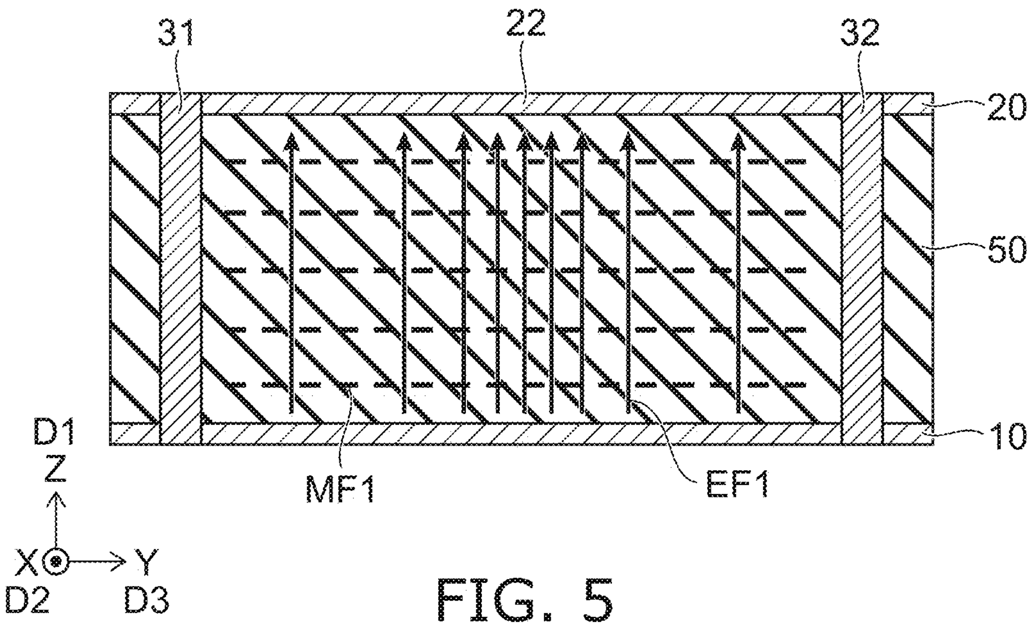
FIG. 5 is a schematic diagram illustrating the characteristics of the high-frequency circuit according to the first embodiment.

FIG. 5 is a schematic diagram illustrating the characteristics of the high-frequency circuit according to the first embodiment.

FIG. 5 illustrates the electromagnetic field distribution of the TE10 mode in the space between the first conductive layer 10 and the second region 22. As shown in FIG. 5, the electric field EF1 is concentrated at the center of the third direction D3. At a position close to the first conductive members 31 and a position close to the second conductive members 32, the electric field EF1 is lowered to be substantially 0. The magnetic field MF1 crosses the electric field EF1. A signal corresponding to the electric field EF1 and the magnetic field MF1 propagates along the X-axis direction in the space surrounded by the first conductive layer 10, the second region 22, the plurality of first conductive members 31 and the plurality of second conductive members 32.

Figure 6:
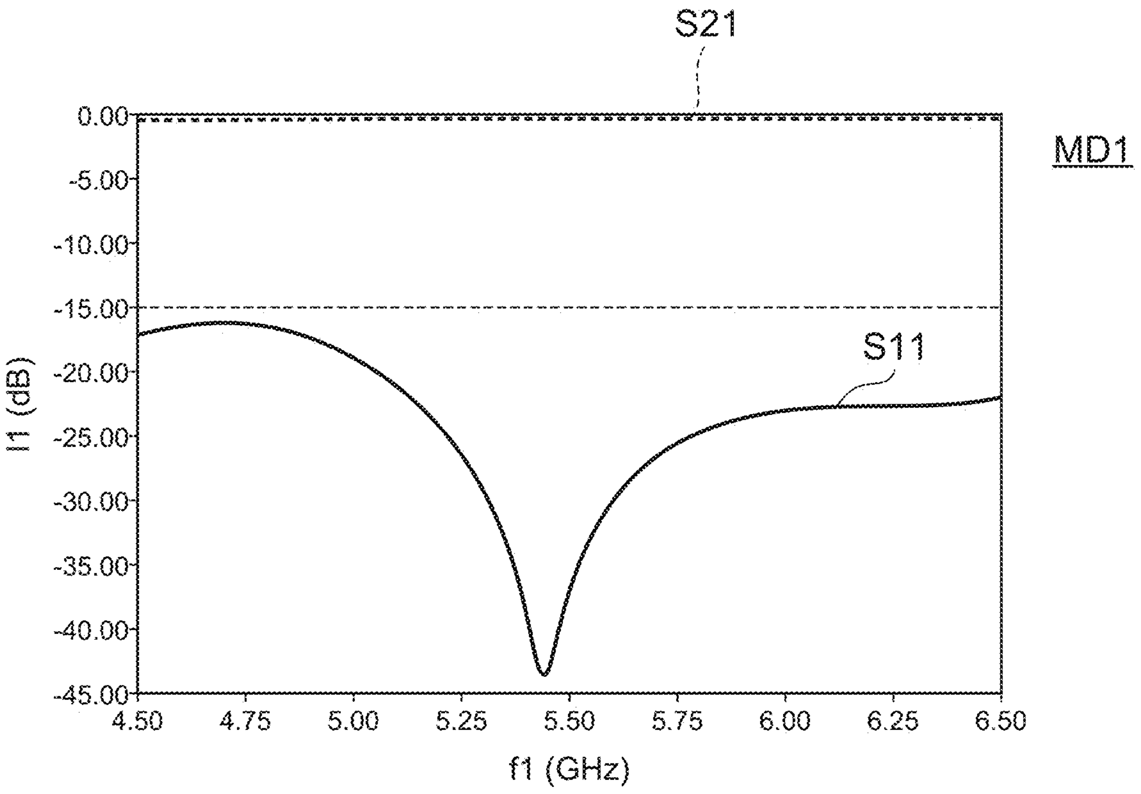
FIG. 6 is a graph illustrating the characteristics of the high-frequency circuit according to the first embodiment.

FIG. 6 is a graph illustrating the characteristics of the high-frequency circuit according to the first embodiment.

FIG. 6 illustrates simulation results of the characteristics of a first model MD1. The first model MD1 corresponds to the high-frequency circuit 110. In the first model MD1, the first region length L1 is 0.97 mm. The second region length L2 is 20 mm. The first wavelength λg is 20 mm. The first distance d1 is λg/2 and 10 mm. The second distance d2 is 13.5 mm. The third distance d3 is λg/40 and is 0.5 mm. The length Wg is λg/4 and 5 mm. The third region length L3 is 5.0 mm. The length Lx3 is λg/4 and 5 mm. The second angle θ2 is 0 degrees. The first region length L1 corresponds to a characteristic impedance of 50Ω. The distance between the plurality of first conductive members 31 is 3.3 mm. The distance between the plurality of second conductive members 32 is 3.3 mm.

The horizontal axis of FIG. 6 is the frequency f1 in GHz. The vertical axis is signal intensity 11 in dB. FIG. 6 shows a scattering parameter of reflection characteristic S11 and a transmission characteristic S21. As shown in FIG. 6, in a wide range of the frequency f1 from 4.5 GHZ to 6.5 GHZ, the reflection characteristic S11 is −15 dB or less. The reflection is suppressed and propagation with high efficiency is obtained.

Figure 7:
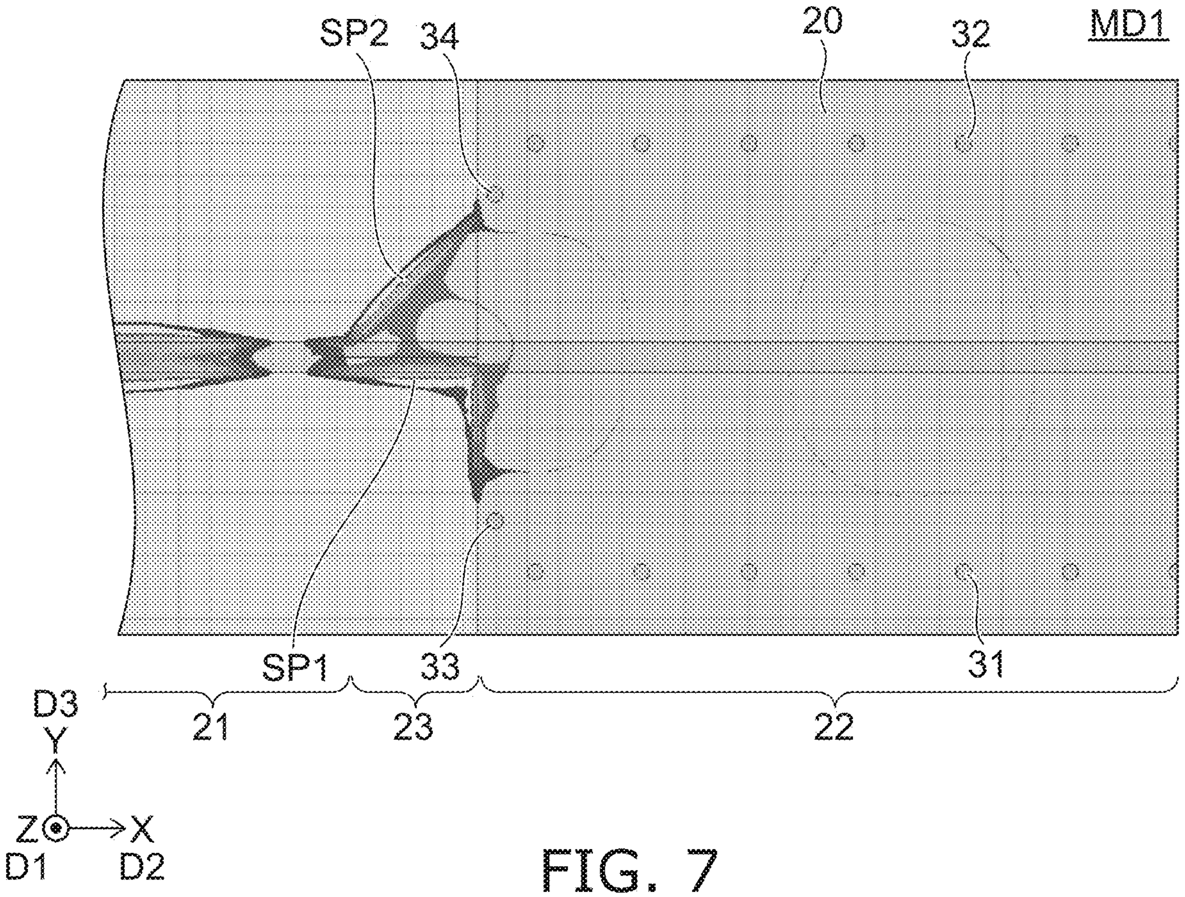
FIG. 7 is a schematic diagram illustrating the characteristics of the high-frequency circuit according to the first embodiment.

FIG. 7 is a schematic diagram illustrating the characteristics of the high-frequency circuit according to the first embodiment.

FIG. 7 illustrates a simulation result of an electric field distribution in the first model MD1. In FIG. 7, the frequency f1 is 5 GHZ. FIG. 7 shows the electric field distribution of one phase state. In FIG. 7, the electric field strength is high in a region where the image is dark. The electric field strength is low in a region where the image is bright.

As shown in FIG. 7, in the vicinity of the third conductive member 33 and the fourth conductive member 34, the electric field is low and substantially zero. The electric field is high near the first side portion SP1 and the second side portion SP2. In the second region 22, the electric field is high in the portion continuous with the first side portion SP1 and along the Y-axis direction.

The propagation mode in the post-wall waveguide corresponding to the second region 22 is the TE10 mode. As described with respect to FIG. 5, the electric field is strongest in the central portion between the plurality of first conductive members 31 and the plurality of second conductive members 32. it is considered that the electric field in the central portion is strongly excited by providing the first side portion SP1 with the first angle θ1 being small or zero. Thereby, the reflection can be suppressed. A highly efficient propagation is obtained. Low-loss propagation can be obtained. A high-frequency circuit capable of improving characteristics can be provided. For example, even if the length Lx3 along the second direction D2 of the third region 23 is shortened, highly efficient propagation with suppressed reflection can be obtained. For example, a compact high-frequency circuit can be provided.

Figure 8:
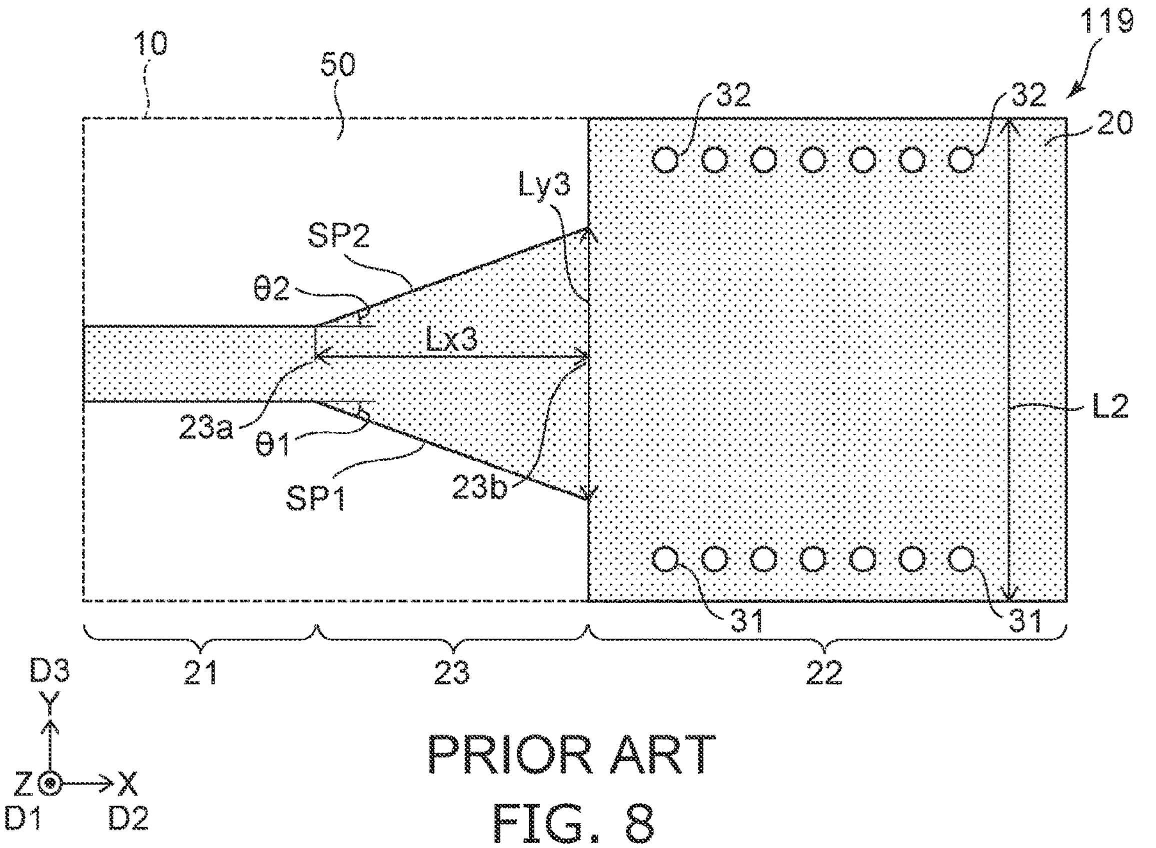
PRIOR ART FIG. 8
FIG. 8 is a schematic plan view illustrating a high-frequency circuit of a reference example.

FIG. 8 is a schematic plan view illustrating a high-frequency circuit of a reference example.

As shown in FIG. 8, in a high-frequency circuit 119 of a reference example, the second conductive layer 20 also includes the first region 21, the second region 22 and the third region 23. The high-frequency circuit 119 is not provided with the third conductive member 33 and the fourth conductive member 34. Furthermore, the shape of the third region 23 in the high-frequency circuit 119 is different from the shape of the third region 23 in the first model MD1 (high-frequency circuit 110). Except for this, the configuration of the high-frequency circuit 119 is the same as the configuration of the first model MD1 (high-frequency circuit 110).

In the high-frequency circuit 119, the first angle θ1 is the same as the second angle θ2. The length Lx3 along the second direction D2 of the third region 23 is λg/2 and is 10 mm. The length Ly3 of the second portion 23*b* along the third direction D3 is 0.4 times the second distance d2.

Figure 9:
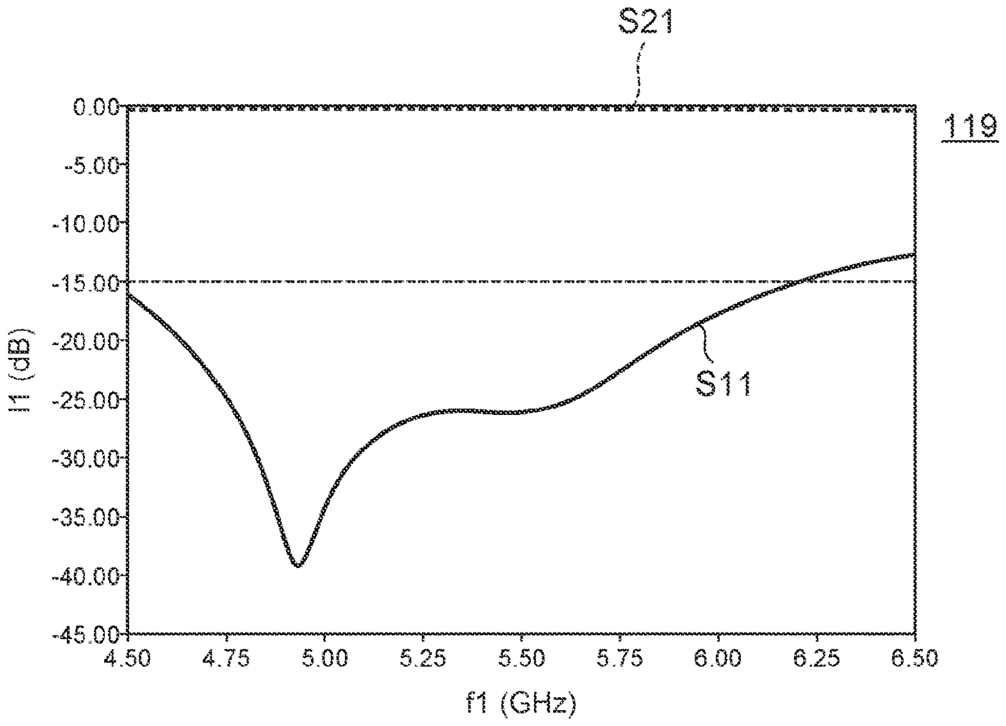
PRIOR ART FIG. 9
FIG. 9 is a graph illustrating the characteristics of the high-frequency circuit of the reference example.

FIG. 9 is a graph illustrating the characteristics of the high-frequency circuit of the reference example.

The horizontal axis of FIG. 9 is the frequency f1 in GHz. The vertical axis is signal intensity 11 in dB. FIG. 9 illustrates simulation results of the characteristics of the high-frequency circuit 119. FIG. 9 shows the reflection characteristic S11 and the transmission characteristic S21 in the high-frequency circuit 119. As shown in FIG. 9, the reflection characteristic S11 exceeds −15 dB in a portion of the frequency f1 of 4.5 GHz to 6.5 GHz. As shown in FIGS. 6 and 9, in the first model MD1 according to the embodiment, the reflection is suppressed as compared with the high-frequency circuit 119 of the reference example.

The length Lx3 of the third region 23 in the-high-frequency circuit 110 (first model MD1) is half the length Lx3 of the third region 23 in the high-frequency circuit 119. In the high-frequency circuit 110, even when the length Lx3 is short, propagation with suppressed reflection is obtained. By providing the third conductive member 33 and the fourth conductive member 34 in the high-frequency circuit 110, the reflection can be suppressed more than in the reference example.

Figure 10:
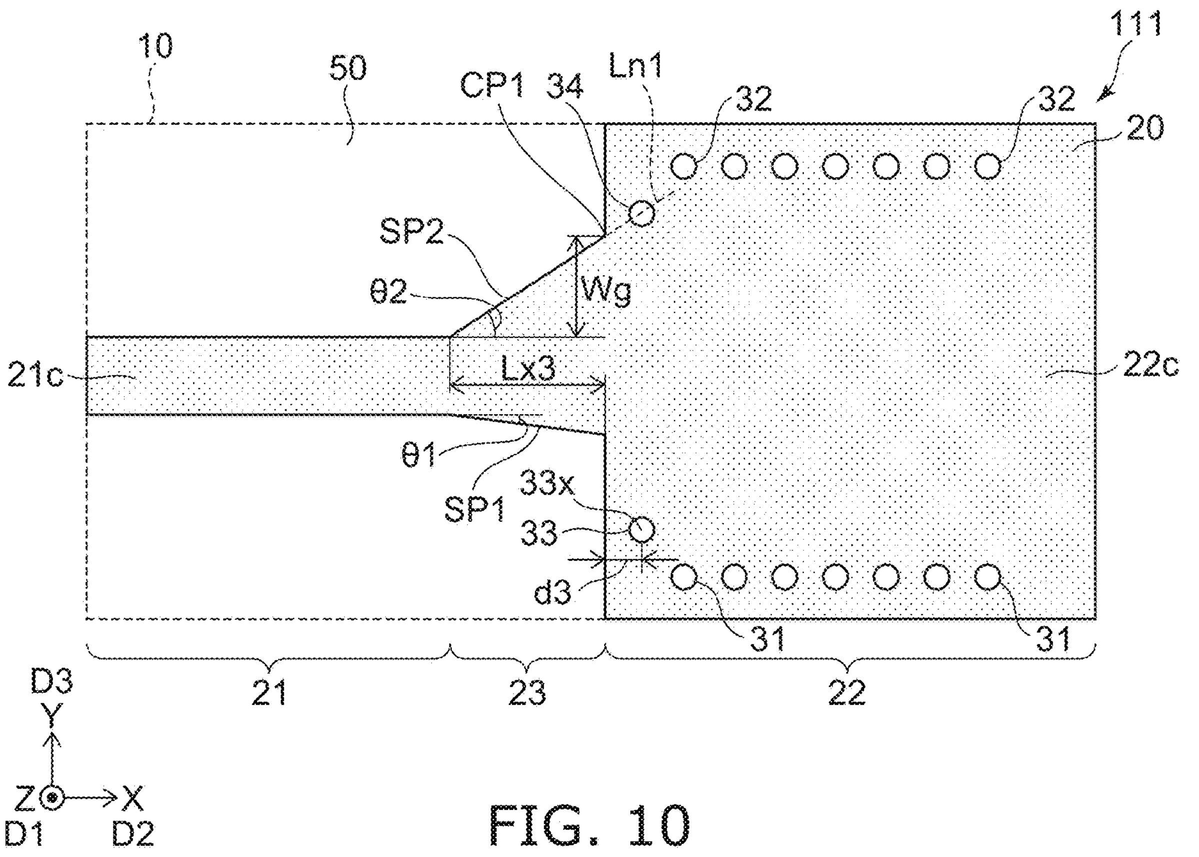
FIG. 10 is a schematic plan view illustrating a high-frequency circuit according to the first embodiment.

FIG. 10 is a schematic plan view illustrating a high-frequency circuit according to the first embodiment.

As shown in FIG. 10, in a high-frequency circuit 111 according to the embodiment, the first angle θ1 is different from the second angle θ2. The first angle θ1 is greater than 0 degrees. Except for this, the configuration of the high-frequency circuit 111 is the same as the configuration of the high-frequency circuit 110. In the high-frequency circuit 111 as well, propagation with suppressed reflection is obtained.

FIGS. 11 to 14 are graphs illustrating characteristics of the high-frequency circuit according to the first embodiment.

Figure 11:
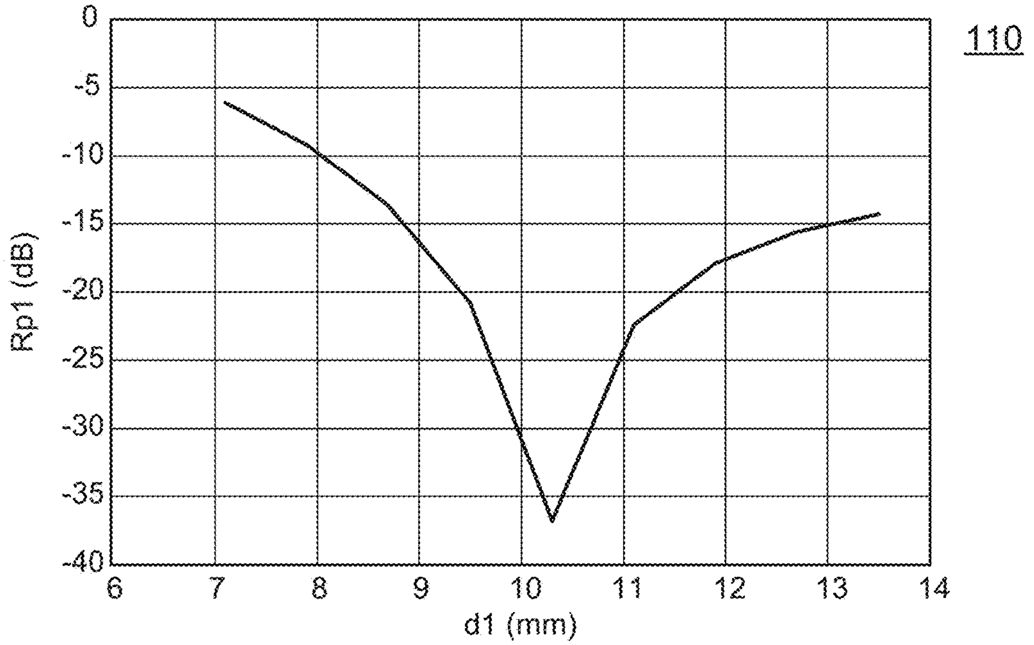
FIG. 11 is a graph illustrating characteristics of the high-frequency circuit according to the first embodiment.
Figure 12:
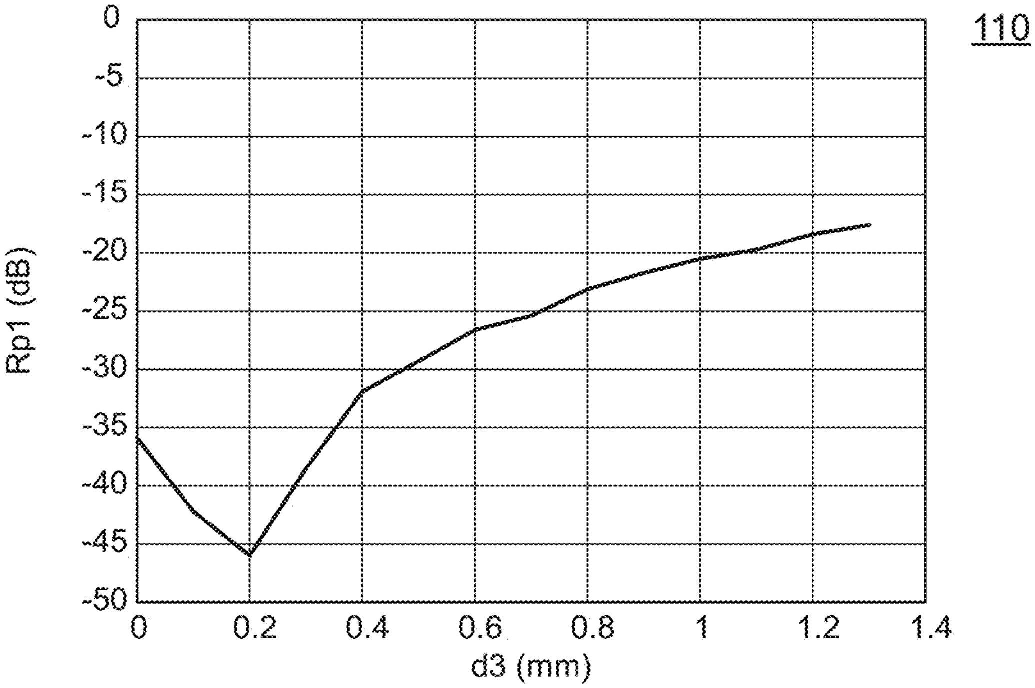
FIG. 12 is a graph illustrating characteristics of the high-frequency circuit according to the first embodiment.
Figure 13:
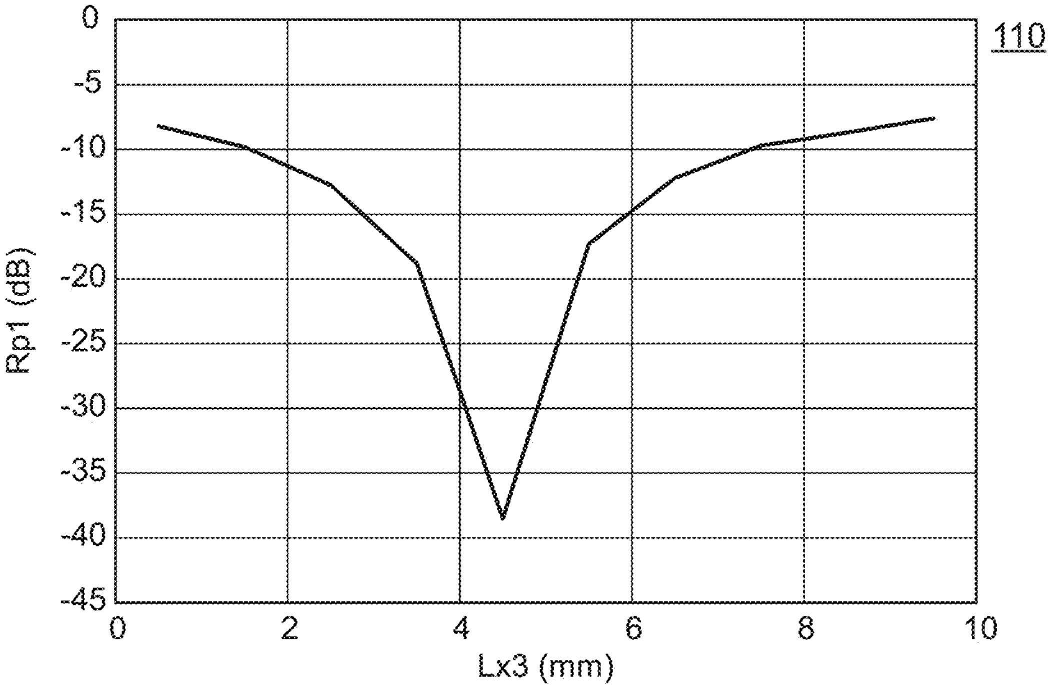
FIG. 13 is a graph illustrating characteristics of the high-frequency circuit according to the first embodiment.
Figure 14:
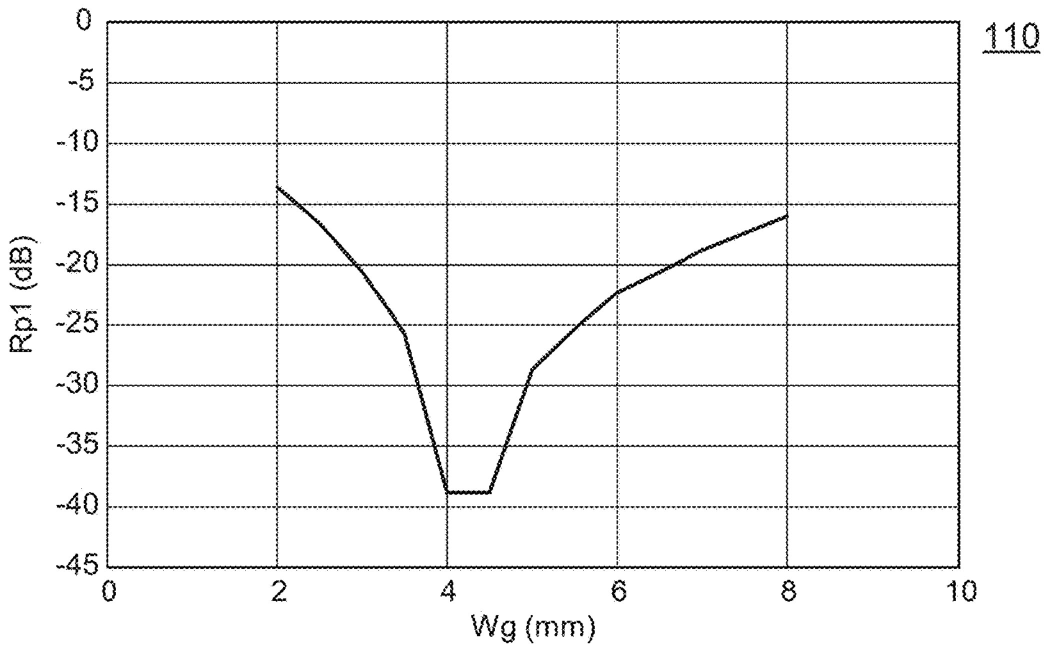
FIG. 14 is a graph illustrating characteristics of the high-frequency circuit according to the first embodiment.

These figures exemplify simulation results of the characteristics of the high-frequency circuit 110 when the pattern of the second conductive layer 20 is changed. The horizontal axis of FIG. 11 is the first distance d1 in mm. The horizontal axis of FIG. 12 is the third distance d3 in mm. The horizontal axis of FIG. 13 is the length Lx3 in mm. The horizontal axis of FIG. 14 is the length Wg in mm. The vertical axis of these figures is the amount of reflection Rp1 in dB at one wavelength.

In the base model of the simulation, the lengths other than those changed in FIGS. 11 to 14 are as follows: The first region length L1 is 0.97 mm. The second region length L2 is 20 mm. The first wavelength λg is 20 mm. The first distance d1 is 10 mm (i.e., λg/2). The second distance d2 is 13.5 mm. The third distance d3 is 0.5 mm (i.e., λg/40). The length Wg is 5 mm (λg/4). The third region length L3 is 5 mm. The length Lx3 is 5 mm (λg/4). The second angle θ2 is 0 degrees.

As shown in FIG. 11, the reflection amount Rp1 being low is obtained when the first distance d1 is not less than 9 mm and not more than 12 mm. For example, the reflection amount Rp1 being low is obtained when the first distance d1 is not less than 0.45 times and not more than 0.6 times the first wavelength λg.

As shown in FIG. 12, the reflection amount Rp1 being low is obtained when the third distance d3 is 1 mm or less. For example, the reflection amount Rp1 being low is obtained when the third distance d3 is 0.1 times or less the first distance d1.

As shown in FIG. 13, the reflection amount Rp1 being low is obtained when the length Lx3 is not less than 3 mm and not more than 6 mm. For example, the reflection amount Rp1 being low is obtained when the length Lx3 is not less than 0.3 times and not more than 0.6 times the first distance d1.

As shown in FIG. 14, the reflection amount Rp1 being low is obtained when the length Wg is not less than 2 mm and not more than 8 mm. For example, the reflection amount Rp1 being low is obtained when the length Wg is not less than 0.2 times and not more than 0.8 times the first distance d1.

Second Embodiment

Figure 15:
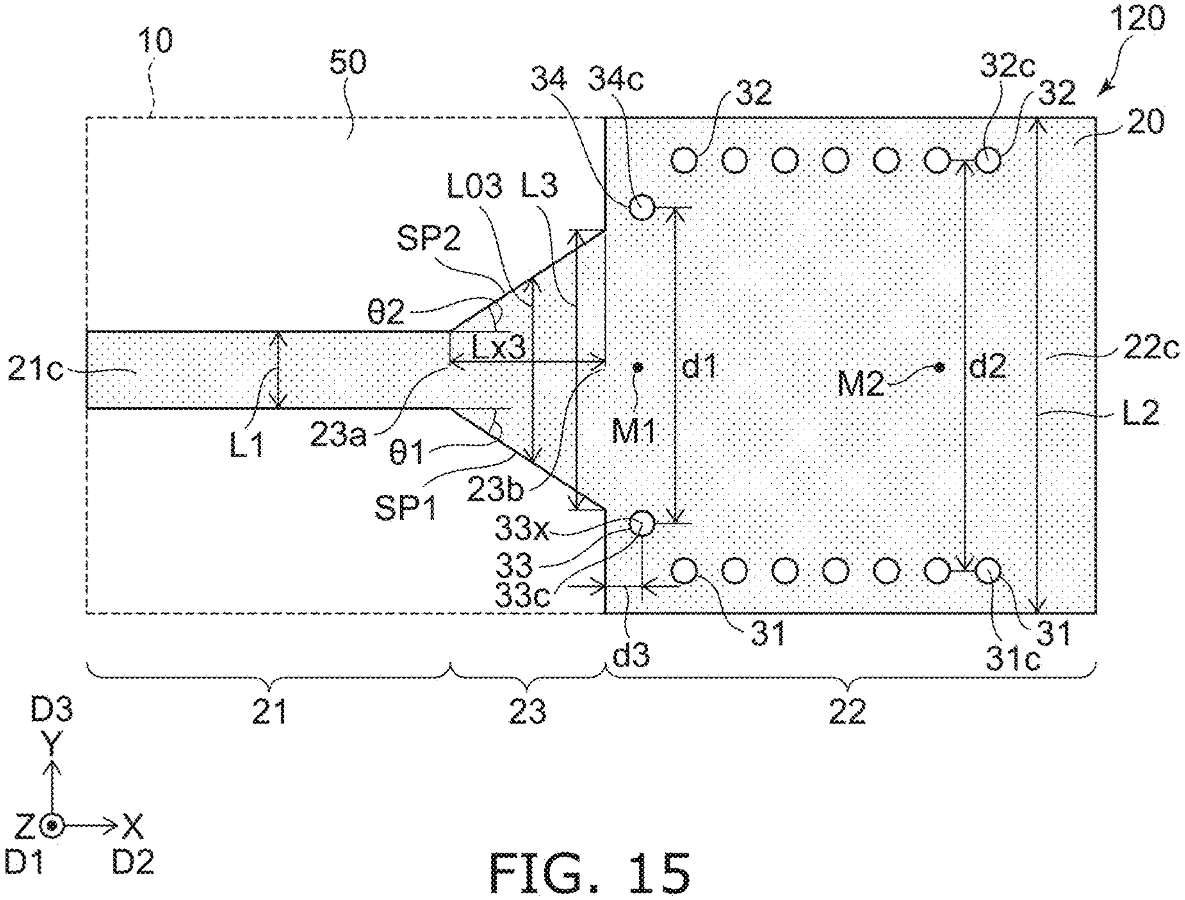
FIG. 15 is a schematic plan view illustrating a high-frequency circuit according to a second embodiment.

FIG. 15 is a schematic plan view illustrating a high-frequency circuit according to a second embodiment.

As shown in FIG. 15, in a high-frequency circuit 120 according to the embodiment, the first angle θ1 is substantially the same as the second angle θ2. In the high-frequency circuit 120, the third region length L3 is approximately 0.4 times the second distance d2. Except for this, the configuration of the high-frequency circuit 120 may be the same as the configuration of the high-frequency circuit 110.

For example, the high-frequency circuit 120 includes the first conductive layer 10 (see FIG. 1), the second conductive layer 20, the plurality of first conductive members 31, the plurality of second conductive members 32, the third conductive member 33 and the fourth conductive member. 34. The second conductive layer 20 includes the first region 21, the second region 22 and the third region 23. The third region 23 is provided between the first region 21 and the second region 22. The second direction D2 from the first region 21 to the second region 22 crosses the first direction D1 from the first conductive layer 10 to the second conductive layer 20 (see FIG. 1). The first region 21 extends along the second direction D2.

As shown in FIG. 15, the second region length L2 of the second region 22 along the third direction D3 is longer than the first region length L1 of the first region 21 along the third direction D3. The third region 23 includes the first portion **23*a* and the second portion 23*b*. The first portion 23*a* is connected to the first region 21. The second portion 23*b* is connected to the second region 22. The third region length L3 along the third direction D3 of the second portion 23*b* is between the first region length L1 and the second region length L2**.

The plurality of first conductive members 31 are arranged along the second direction D2. The plurality of second conductive members 32 are arranged along the second direction D2. The plurality of second conductive members 32 are separated from the plurality of first conductive members 31 in the third direction D3.

The position of the third conductive member 33 in the second direction D2 is between the position of the third region 23 in the second direction D2 and the position of the plurality of first conductive members 31 in the second direction D2. The position of the fourth conductive member 34 in the second direction D2 is between the position of the third region 23 in the second direction D2 and the positions of the plurality of second conductive members 32 in the second direction D2. The fourth conductive member 34 is separated from the third conductive member 33 in the third direction D3.

The distance in the third direction D3 between the third center **33*c* in the third direction D3 of the third conductive member 33 and the fourth center 34*c* in the third direction D3 of the fourth conductive member 34 is defined as the first distance d1. The distance in the third direction D3 between the first center 31*c* in the third direction D3 of one of the plurality of first conductive members 31 and the second center 32*c* in the third direction D3 of one of the plurality of second conductive members 32 is defined as the second distance d2. In the high-frequency circuit 120, the first distance d1 is shorter than the second distance d2**.

In the high-frequency circuit 120, the third region length L3 is not less than 0.3 times and not more than 0.6 times the second distance d2. For example, the third region length L3 is approximately 0.4 times the second distance d2.

In the high-frequency circuit 120, the length Lx3 along the second direction D2 of the third region 23 is not less than 0.4 times and not more than 0.6 times the first distance d1.

In the high-frequency circuit 120, the third conductive member 33 and the fourth conductive member 34 are also provided. Thereby, even when the length Lx3 along the second direction D2 of the third region 23 is short, highly efficient propagation is obtained.

In the high-frequency circuit 120, the first conductive layer 10, the second region 22, the plurality of first conductive members 31, and the plurality of second conductive members 32 guide the signal of the first wavelength λg. The first distance d1 is, for example, not less than 0.4 times and not more than 0.6 times the first wavelength λg. The first wavelength λg is, for example, the guide wavelength of the waveguide. The first wavelength λg is, for example, not less than 19 mm and not more than 22 mm. The first wavelength λg may be, for example, 15 mm or less.

As shown in FIG. 15, in the high-frequency circuit 120, the distance in the second direction D2 between the third region 23 and the position of the center **33*x* in the second direction D2 of the third conductive member 33** in the second direction D2 is defined as the third distance d3. The third distance d3 may be, for example, not less than 0 times and not more than 1/10 times the first distance d1. The third distance d3 may be, for example, not less than 0 and not more than λg/20.

As shown in FIG. 15, the midpoint in the third direction D3 between the third conductive member 33 and the fourth conductive member 34 is defined as the first midpoint M1. The midpoint in the third direction D3 between the plurality of first conductive members 31 and the plurality of second conductive members 32 is defined as the second midpoint M2. The direction from the first midpoint M1 to the second midpoint M2 is along the second direction D2.

As shown in FIG. 15, the direction from the first region center 21*c* in the third direction D3 of the first region 21 to the second region center 22*c* in the third direction D3 of the second region 22 is along the second direction D2.

As shown in FIG. 15, in the high-frequency circuit 120, the third region 23 includes the first side portion SP1 and the second side portion SP2. The direction from the first side portion SP1 to the second side portion SP2 is along the third direction D3. The first angle θ1 between the first side portion SP1 and the second direction D2 is not less than 0.9 times and not more than 1.1 times the second angle θ2 between the second side portion SP2 and the second direction D2.

The high-frequency circuit 120 may include the insulating member 50. The insulating member 50 is provided between the first conductive layer 10 and the second conductive layer 20. The insulating member 50 is provided around the plurality of first conductive members 31, the plurality of second conductive members 32, the third conductive member 33 and the fourth conductive member 34 in the second direction D2 and the third direction D3.

Figure 16:
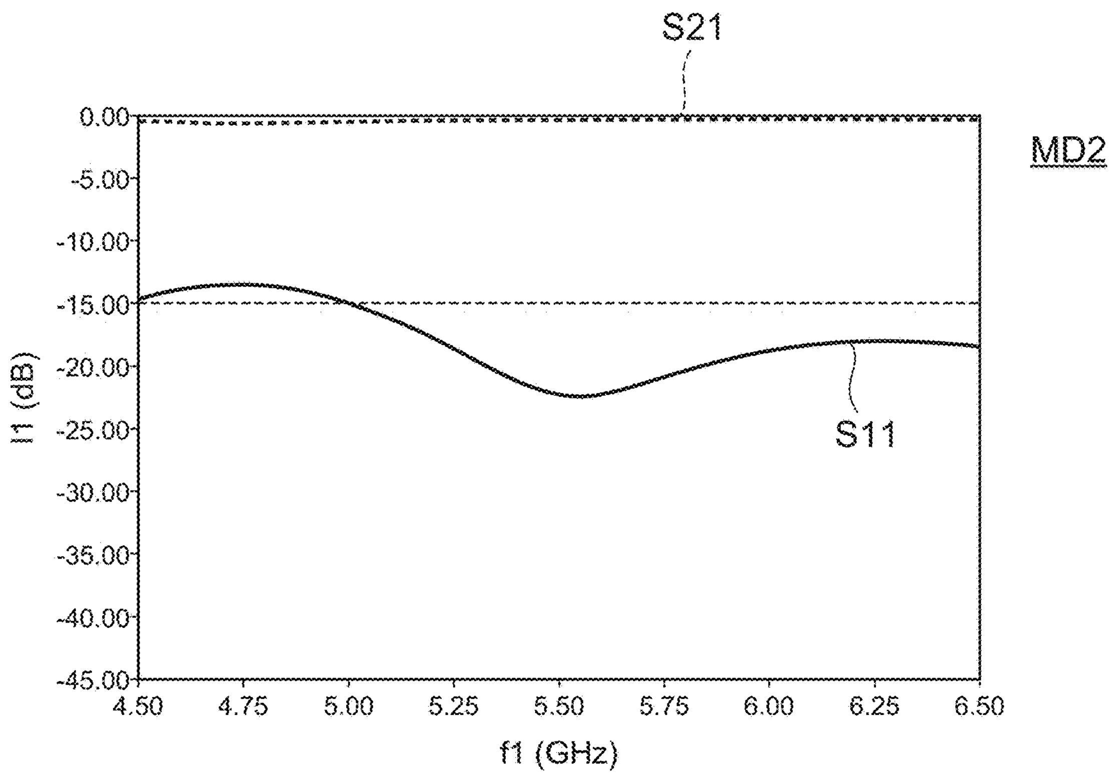
FIG. 16 is a graph illustrating the characteristics of the high-frequency circuit according to the second embodiment.

FIG. 16 is a graph illustrating the characteristics of the high-frequency circuit according to the second embodiment.

The horizontal axis of FIG. 16 is the frequency f1 in GHz. The vertical axis is signal intensity 11 in dB. FIG. 16 illustrates simulation results of the characteristics of the second model MD2 corresponding to the high-frequency circuit 120. FIG. 16 shows the reflection characteristic S11 and the transmission characteristic S21 in the second model MD2. As shown in FIG. 16, in the second model MD2 (high-frequency circuit 120), the reflection characteristic S11 is about −15 dB or less for the frequency f1 being 4.5 GHz to 6.5 GHZ.

In the high-frequency circuit 120 (second model MD2), the length Lx3 of the third region 23 is ½ of the length Lx3 of the third region 23 in the high-frequency circuit 119. In the high-frequency circuit 120, even when the length Lx3 is short, efficient propagation characteristics are obtained by providing the third conductive member 33 and the fourth conductive member 34.

FIGS. 17 to 20 are graphs illustrating characteristics of the high-frequency circuit according to the second embodiment.

Figure 17:
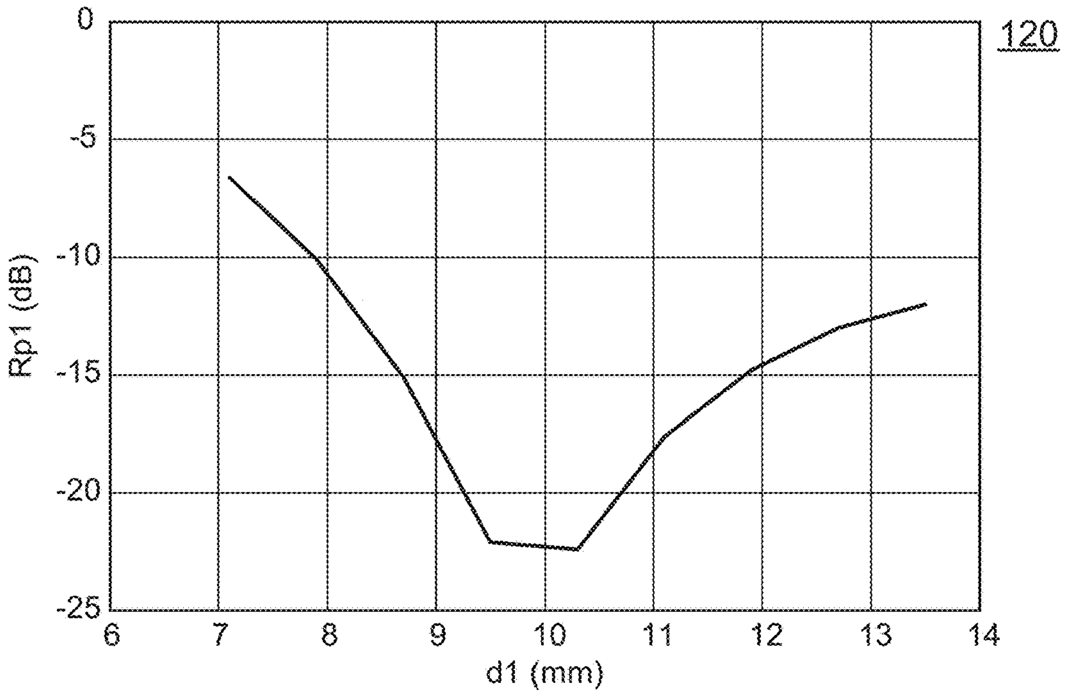
FIG. 17 is a graph illustrating characteristics of the high-frequency circuit according to the second embodiment.
Figure 18:
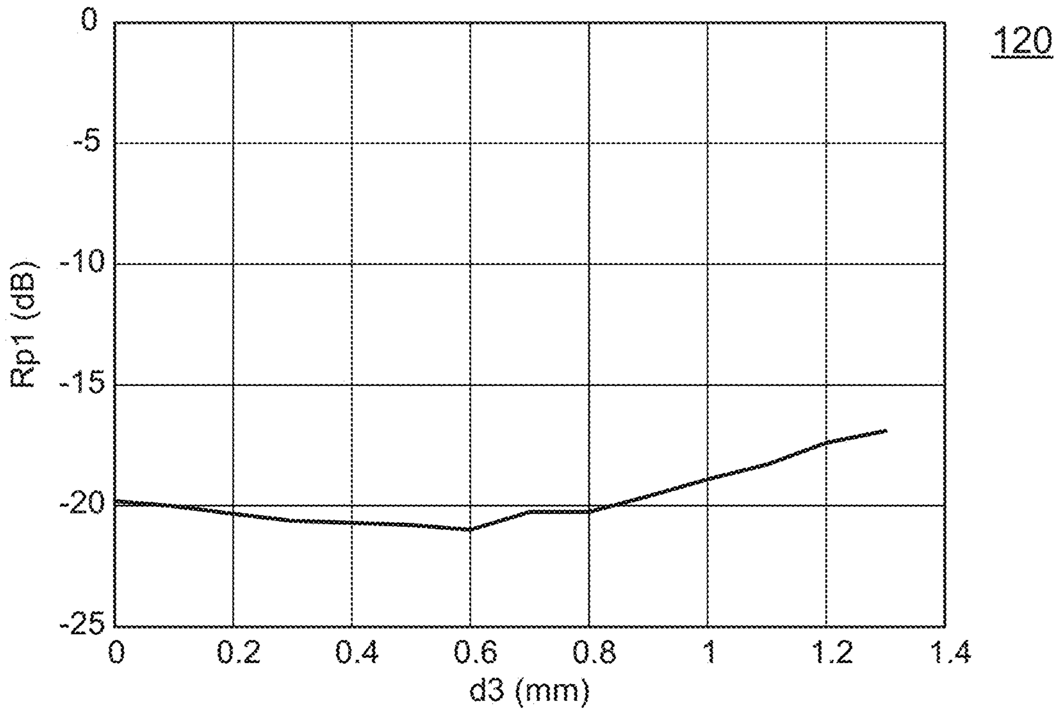
FIG. 18 is a graph illustrating characteristics of the high-frequency circuit according to the second embodiment.
Figure 19:
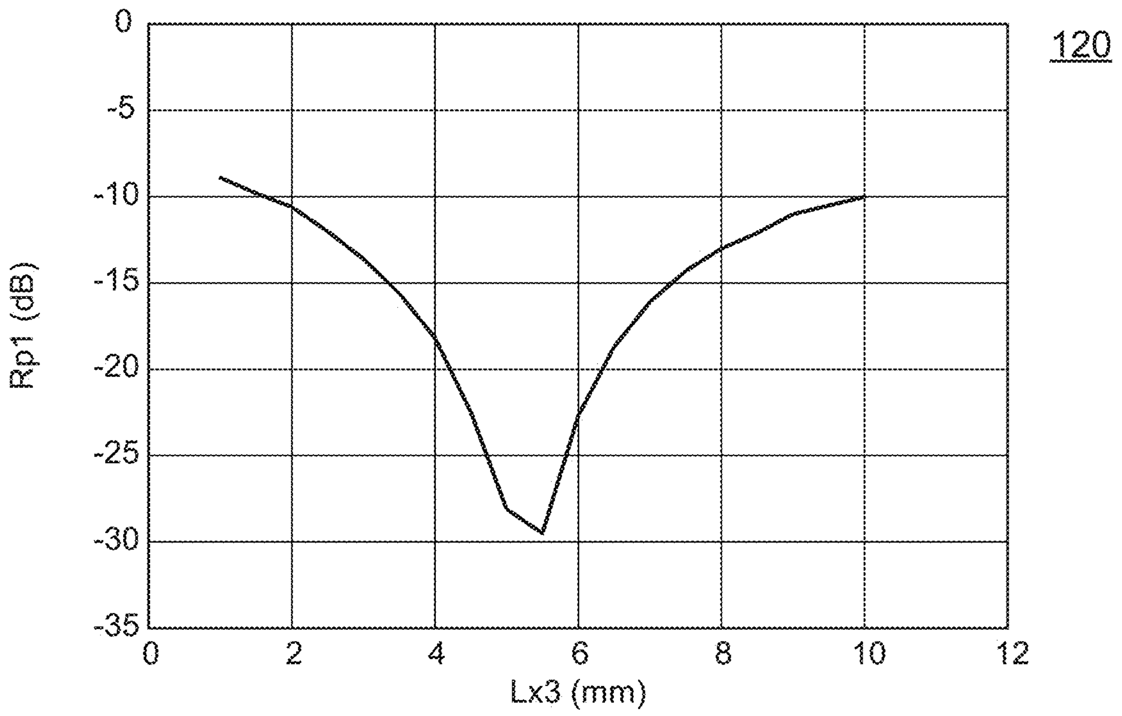
FIG. 19 is a graph illustrating characteristics of the high-frequency circuit according to the second embodiment.
Figure 20:
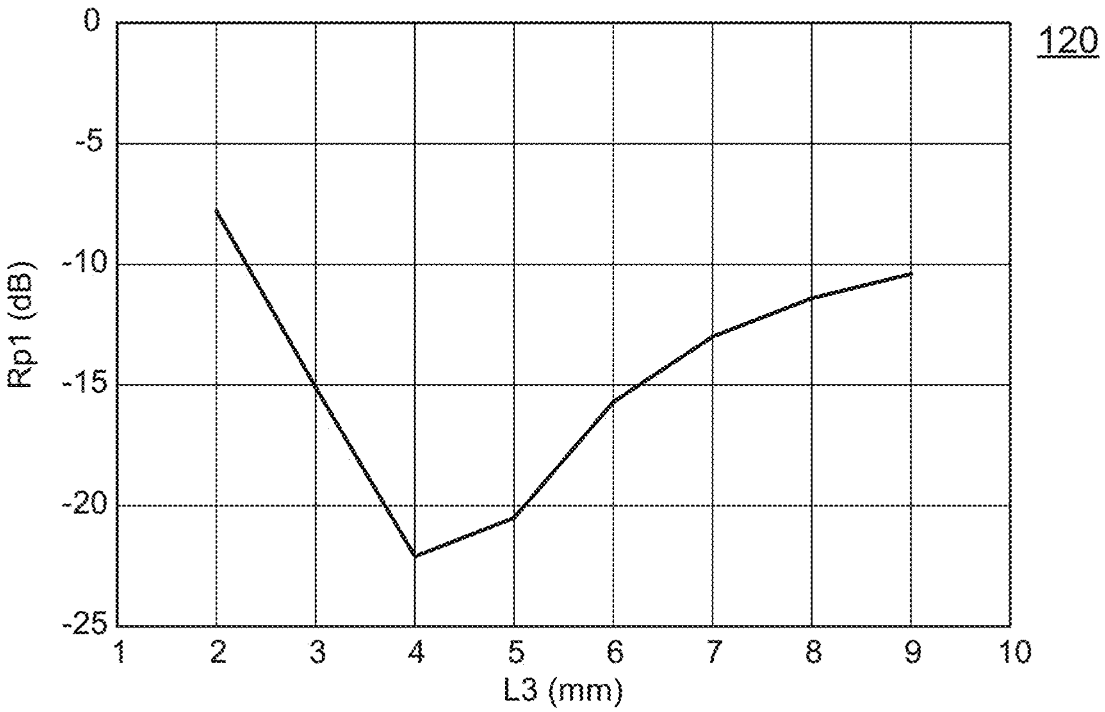
FIG. 20 is a graph illustrating characteristics of the high-frequency circuit according to the second embodiment.

These figures illustrate simulation results of the characteristics of the high-frequency circuit 120 when the pattern of the second conductive layer 20 is changed. The horizontal axis of FIG. 17 is the first distance d1 in mm. The horizontal axis of FIG. 18 is the third distance d3 in mm. The horizontal axis of FIG. 19 is the length Lx3 in mm. The horizontal axis of FIG. 20 is the third region length L3 in mm. The vertical axis of these figures is the amount of reflection Rp1 at one wavelength.

In the base model of the simulation, the lengths other than those changed in FIGS. 17-20 are as follows: The first region length L1 is 0.97 mm. The second region length L2 is 20 mm. The first wavelength λg is 20 mm. The first distance d1 is 10 mm (i.e., λg/2). The second distance d2 is 13.5 mm. The third distance d3 is 0.5 mm (i.e., λg/40). The third region length L3 is 5 mm. The length Lx3 is 5 mm (λg/4).

As shown in FIG. 17, the reflection amount Rp1 being low is obtained when the first distance d1 is not less than 9 mm and not more than 12 mm. For example, the reflection amount Rp1 being low is obtained when the first distance d1 is not less than 0.45 times and not more than to 0.6 times the first wavelength λg.

As shown in FIG. 18, the reflection amount Rp1 being low is obtained when the third distance d3 is 1.3 mm or less. For example, the reflection amount Rp1 being low is obtained when the third distance d3 is 0.13 times or less the first distance d1.

As shown in FIG. 19, the reflection amount Rp1 being low is obtained when the length Lx3 is not less than 3 mm and not more than 7 mm. For example, the reflection amount Rp1 being low is obtained when the length Lx3 is not less than 0.3 times and not more than 0.7 times the first distance d1.

As shown in FIG. 20, the reflection amount Rp1 being low is obtained when the third region length L3 is not less than 3 mm and not more than 4 mm. For example, the low reflection amount Rp1 being low is obtained when the length Wg is not less than 0.3 times and not more than 0.4 times the first distance d1.

The high-frequency circuits (for example, the high-frequency circuits 110, 111, and 120) according to the embodiments can be applied, for example, to conversion circuits for transmission lines. Transmission lines are used, for example, in communication equipment. For example, communication equipment that communicates information wirelessly or by wire includes various high-frequency components. Various high frequency components include, for example, amplifiers, mixers and filters. Various high-frequency components are applied in various shapes, such as coaxial, waveguide, or planar circuits, depending on the application.

For example, in the planar circuits, transmission lines such as microstrip or coplanar structures are used. In the planar circuits in the millimeter wave band, for example, a post-wall waveguide structure is used. In the post-wall waveguide structure, a lower loss transmission characteristic can be obtained compared to the microstrip structure or the coplanar structure. In the post-wall waveguide structure, for example, metal electrodes are provided above and below a dielectric substrate. A plurality of metal posts are provided to connect between the upper and lower electrodes. The plurality of metal posts are provided periodically at sufficiently small intervals with respect to the propagation wavelength. The area surrounded by them can be regarded as a pseudo-dielectric-loaded waveguide. Radio waves propagate within the region surrounded by them.

For example, in the millimeter wave band or the terahertz band, the effect on the loss of the surface resistance of the conductor becomes significant. The post-wall waveguide using a low-loss dielectric substrate provides low-loss propagation compared to the microstrip or the coplanar structure.

The microstrip structure or the coplanar structure, for example, is used to connect the components of the post wall waveguide structure and other high frequency components. These structures have good connectivity with, for example, connectors. Conversion circuitry from the post wall waveguides to these lines is required.

For example, in a reference example, the microstrip line and the post-wall waveguide are connected by a conversion circuit including a tapered line. The length of the tapered line is about half the waveguide wavelength (first wavelength λg). Therefore, the conversion circuit in the reference example requires a certain length, which makes it difficult to reduce the size of the conversion circuit. For example, if such a conversion circuit is provided in each of the input section and the output section of the electronic circuit, the area occupied by the conversion circuit increases. Therefore, miniaturization of the electronic circuit becomes difficult.

In the embodiment, the third conductive member 33 and the fourth conductive member 34 are provided. As a result, even if the length (length Lx3) of the conversion circuit (third region 23) is shortened, a good waveguide configuration can be obtained. For example, miniaturization is possible while maintaining good characteristics.

For example, when realizing a high-frequency circuit such as a low-loss filter in a high-frequency band such as a millimeter wave band, a low-loss characteristic can be obtained by using a waveguide structure. The waveguide structures provide low loss characteristics compared to planar circuits (e.g., microstrip or coplanar structures). The waveguide structure, on the other hand, is a rigid circuit. Since the waveguide structure includes a connection flange portion and the like, the circuit becomes large. For example, miniaturization is desired in a circuit such as an array antenna in which a plurality of circuit elements are provided.

On the other hand, a circuit structure using the post-wall waveguide is advantageous in miniaturizing the circuit.

A plurality of metal posts are periodically provided in the post wall waveguide (the portion including the second region 22). The plurality of the metal posts include, for example, the plurality of first conductive members 31 and the plurality of second conductive members 32. The plurality of metal posts act as pseudo metal walls. In the post-wall waveguide, radio wave propagation is obtained like a dielectric-loaded waveguide.

For example, a material with low dielectric loss may be applied for the dielectric. A low-loss transmission line can be obtained in a high frequency band like a waveguide. For example, post wall waveguides are easily obtained by forming through holes in the substrate.

In the embodiment, the third region 23 is provided which is a tapered portion. The length Lx3 in the second direction D2 of the third region 23 can be set to about λg/4. Good waveguide characteristics can be obtained even if the length (size) of the conversion circuit is reduced to half that of the reference example (high-frequency circuit 119).

For example, in the high-frequency circuit 120, the length Lx3 of the third region 23 in the second direction D2 is λg/4. Further, the third conductive member 33 and the fourth conductive member 34 are provided. The spacing between these conductive members is approximately λg/2. Such a third region 23 serves as a conversion circuit between the microstrip line and the post-wall waveguide.

In the embodiments, the first region 21 corresponds to, for example, a microstrip line. The first region 21 may include a coplanar structure. The first region 21 may include a grounded coplanar structure. The first region 21 may include strip line structures and the like.

The embodiments may include the following configurations (for example, technical proposals).

Configuration 1

A high-frequency circuit, comprising:

a first conductive layer;

a second conductive layer, the second conductive layer including a first region, a second region, and a third region between the first region and the second region, a second direction from the first region to the second region crossing a first direction from the first conductive layer to the second conductive layer, the first region extends along the second direction, a second region length along a third direction of the second region being longer than a first region length along the third direction of the first region, the third direction crossing a plane including the first direction and the second direction, the third region including a first portion and a second portion, the first portion being connected to the first region, the second portion being connected to the second region, a third region length along the third direction of the second portion being between the first region length and the second region length;

a plurality of first conductive members arranged along the second direction, the plurality of first conductive members being connected to the first conductive layer and the second region;

a plurality of second conductive members arranged along the second direction, the plurality of second conductive members being connected to the first conductive layer and the second region, the plurality of second conductive members being separated from the plurality of first conductive members in the third direction;

a third conductive member connected to the first conductive layer and the second region, a position of the third conductive member in the second direction being between a position of the third region in the second direction and a position of the plurality of first conductive members in the second direction; and a fourth conductive member connected to the first conductive layer and the second region, a position of the fourth conductive member in the second direction being between the position of the third region in the second direction and a position of the plurality of second conductive members in the second direction, the fourth conductive member being separated from the third conductive member in the third direction, a first distance in the third direction between a third center in the third direction of the third conductive member and a fourth center in the third direction of the fourth conductive member being shorter than a second distance in the third direction between a first center in the third direction of one of the plurality of first conductive members and a second center in the third direction of one of the plurality of second conductive members, the third region including a first side portion and a second side portion, a direction from the first side portion to the second side portion being along the third direction, and a first angle between the first side portion and the second direction being different from a second angle between the second side portion and the second direction.

Configuration 2

The high-frequency circuit according to Configuration 1, wherein an absolute value of the first angle is not less than 0 degrees and not more than 10 degrees.

Configuration 3

The high-frequency circuit according to Configuration 1, wherein the first side portion extends along the second direction.

Configuration 4

The high-frequency circuit according to any one of Configurations 1-3, wherein a length of the third region along the third direction monotonously increases in a direction from the first region to the second region.

Configuration 5

The high-frequency circuit according to any one of Configurations 1-3, wherein a length of the third region along the third direction increases linearly in a direction from the first region to the second region.

Configuration 6

The high-frequency circuit according to any one of Configurations 1-5, wherein a difference between the third region length and the first region length is not less than 0.4 times and not more than 0.6 times the first distance.

Configuration 7

The high-frequency circuit according to any one of Configurations 1-6, wherein a straight line passing through the second side portion and along the second side portion passes through the fourth conductive member.

Configuration 8

The high-frequency circuit according to any one of Configurations 1-7, wherein one of the plurality of second conductive members is closest to the third region among the plurality of second conductive members, and the fourth conductive member is provided between a connection point between the second side portion and the second region and the one of the plurality of second conductive members.

Configuration 9

The high-frequency circuit according to any one of Configurations 1-8, wherein a third distance in the second direction between the third region and a position of a center of the third conductive member in the second direction in the second direction is not less than 0 times and not more than 1/10 times the first distance.

Configuration 10

The high-frequency circuit according to any one of Configurations 1-8, wherein a length of the third region along the second direction is not less than 0.4 times and not more than 0.6 times the first distance.

Configuration 11

The high-frequency circuit according to any one of Configurations 1-10, wherein the first conductive layer, the second region, the plurality of first conductive members, and the plurality of second conductive members are configured to guide a signal with a first wavelength, and the first distance is not less than 0.4 times and not more than 0.6 times the first wavelength.

Configuration 12

The high-frequency circuit according to Configuration 11, wherein the first wavelength is not more than 15 mm, or the first wavelength is not less than 19 mm and not more than 22 mm.

Configuration 13

The high-frequency circuit according to any one of Configurations 1-12, wherein a direction from a first region center in the third direction of the first region to a second region center in the third direction of the second region is along the second direction.

Configuration 14

A high-frequency circuit, comprising:

a first conductive layer;

a second conductive layer, the second conductive layer including a first region, a second region, and a third region between the first region and the second region, a second direction from the first region to the second region crossing a first direction from the first conductive layer to the second conductive layer, the first region extends along the second direction, a second region length along a third direction of the second region being longer than a first region length along the third direction of the first region, the third direction crossing a plane including the first direction and the second direction, the third region including a first portion and a second portion, the first portion being connected to the first region, the second portion being connected to the second region, a third region length along the third direction of the second portion being between the first region length and the second region length;

a plurality of first conductive members arranged along the second direction, the plurality of first conductive members being connected to the first conductive layer and the second region;

a plurality of second conductive members arranged along the second direction, the plurality of second conductive members being connected to the first conductive layer and the second region, the plurality of second conductive members being separated from the plurality of first conductive members in the third direction;

a third conductive member connected to the first conductive layer and the second region, a position of the third conductive member in the second direction being between a position of the third region in the second direction and a position of the plurality of first conductive members in the second direction; and a fourth conductive member connected to the first conductive layer and the second region, a position of the fourth conductive member in the second direction being between the position of the third region in the second direction and a position of the plurality of second conductive members in the second direction, the fourth conductive member being separated from the third conductive member in the third direction, a first distance in the third direction between a third center in the third direction of the third conductive member and a fourth center in the third direction of the fourth conductive member being shorter than a second distance in the third direction between a first center in the third direction of one of the plurality of first conductive members and a second center in the third direction of one of the plurality of second conductive members, the third region length being not less than 0.3 times and not more than 0.6 times the second distance, and a length of the third region along the second direction being not less than 0.4 times and not more than 0.6 times the first distance.

Configuration 15

The high-frequency circuit according to Configuration 14, wherein the third region includes a first side portion and a second side portion, a direction from the first side portion to the second side portion is along the third direction, and a first angle between the first side portion and the second direction is not less than 0.9 times and not more than 1.1 times a second angle between the second side portion and the second direction.

Configuration 16

The high-frequency circuit according to Configuration 14 or 15, wherein a third distance in the second direction between the third region and a position of a center of the third conductive member in the second direction in the second direction is not less than 0 times and not more than 1/10 times the first distance.

Configuration 17

The high-frequency circuit according to any one of Configurations 14-16, wherein a direction from a first midpoint in the third direction between the third conductive member and the fourth conductive member to a second midpoint in the third direction between the plurality of first conductive members and the plurality of second conductive members is along the second direction.

Configuration 18

The high-frequency circuit according to any one of Configurations 14-17, wherein a direction from a first region center in the third direction of the first region to a second region center in the third direction of the second region is along the second direction.

Configuration 19

The high-frequency circuit according to any one of Configurations 14-18, wherein the first conductive layer, the second region, the plurality of first conductive members, and the plurality of second conductive members are configured to guide a signal with a first wavelength, the first distance is not less than 0.4 times and not more than 0.6 times the first wavelength, and the first wavelength is not more than 15 mm, or the first wavelength is not less than 19 mm and not more than 22 mm.

Configuration 20

The high-frequency circuit according to any one of Configurations 1-19, further comprising:

an insulating member provided between the first conductive layer and the second conductive layer, the insulating member being provided around the plurality of first conductive members and the plurality of second conductive members in the second direction and the third direction.

According to the embodiments, it is possible to provide a high-frequency circuit capable of improving characteristics.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in high-frequency circuits such as conductive layers, conductive members, insulating members, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all high-frequency circuits practicable by an appropriate design modification by one skilled in the art based on the high-frequency circuits described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A high-frequency circuit, comprising:

a first conductive layer;

a second conductive layer, the second conductive layer including a first region, a second region, and a third region between the first region and the second region, a second direction from the first region to the second region crossing a first direction from the first conductive layer to the second conductive layer, the first region extends along the second direction, a second region length along a third direction of the second region being longer than a first region length along the third direction of the first region, the third direction crossing a plane including the first direction and the second direction, the third region including a first portion and a second portion, the first portion being connected to the first region, the second portion being connected to the second region, a third region length along the third direction of the second portion being between the first region length and the second region length;

a plurality of first conductive members arranged along the second direction, the plurality of first conductive members being connected to the first conductive layer and the second region;

a plurality of second conductive members arranged along the second direction, the plurality of second conductive members being connected to the first conductive layer and the second region, the plurality of second conductive members being separated from the plurality of first conductive members in the third direction;

a third conductive member connected to the first conductive layer and the second region, a position of the third conductive member in the second direction being between a position of the third region in the second direction and a position of the plurality of first conductive members in the second direction; and a fourth conductive member connected to the first conductive layer and the second region, a position of the fourth conductive member in the second direction being between the position of the third region in the second direction and a position of the plurality of second conductive members in the second direction, the fourth conductive member being separated from the third conductive member in the third direction, a first distance in the third direction between a third center in the third direction of the third conductive member and a fourth center in the third direction of the fourth conductive member being shorter than a second distance in the third direction between a first center in the third direction of one of the plurality of first conductive members and a second center in the third direction of one of the plurality of second conductive members, the third region including a first side portion and a second side portion, a direction from the first side portion to the second side portion being along the third direction, and a first angle between the first side portion and the second direction being different from a second angle between the second side portion and the second direction.

2. The circuit according to claim 1, wherein an absolute value of the first angle is not less than 0 degrees and not more than 10 degrees.

3. The circuit according to claim 1, wherein the first side portion extends along the second direction.

4. The circuit according to claim 1, wherein a length of the third region along the third direction monotonously increases in a direction from the first region to the second region.

5. The circuit according to claim 1, wherein a length of the third region along the third direction increases linearly in a direction from the first region to the second region.

6. The circuit according to claim 1, wherein a difference between the third region length and the first region length is not less than 0.4 times and not more than 0.6 times the first distance.

7. The circuit according to claim 1, wherein a straight line passing through the second side portion and along the second side portion passes through the fourth conductive member.

8. The circuit according to claim 1, wherein one of the plurality of second conductive members is closest to the third region among the plurality of second conductive members, and the fourth conductive member is provided between a connection point between the second side portion and the second region and the one of the plurality of second conductive members.

9. The circuit according to claim 1, wherein a third distance in the second direction between the third region and a position of a center of the third conductive member in the second direction in the second direction is not less than 0 times and not more than 1/10 times the first distance.

10. The circuit according to claim 1, wherein a length of the third region along the second direction is not less than 0.4 times and not more than 0.6 times the first distance.

11. The circuit according to claim 1, wherein the first conductive layer, the second region, the plurality of first conductive members, and the plurality of second conductive members are configured to guide a signal with a first wavelength, and the first distance is not less than 0.4 times and not more than 0.6 times the first wavelength.

12. The circuit according to claim 11, wherein the first wavelength is not more than 15 mm, or the first wavelength is not less than 19 mm and not more than 22 mm.

13. The circuit according to claim 1, wherein a direction from a first region center in the third direction of the first region to a second region center in the third direction of the second region is along the second direction.

14. The circuit according to claim 1, further comprising:

an insulating member provided between the first conductive layer and the second conductive layer, the insulating member being provided around the plurality of first conductive members and the plurality of second conductive members in the second direction and the third direction.

15. A high-frequency circuit, comprising:

a first conductive layer;

a second conductive layer, the second conductive layer including a first region, a second region, and a third region between the first region and the second region, a second direction from the first region to the second region crossing a first direction from the first conductive layer to the second conductive layer, the first region extends along the second direction, a second region length along a third direction of the second region being longer than a first region length along the third direction of the first region, the third direction crossing a plane including the first direction and the second direction, the third region including a first portion and a second portion, the first portion being connected to the first region, the second portion being connected to the second region, a third region length along the third direction of the second portion being between the first region length and the second region length;

a plurality of first conductive members arranged along the second direction, the plurality of first conductive members being connected to the first conductive layer and the second region;

a plurality of second conductive members arranged along the second direction, the plurality of second conductive members being connected to the first conductive layer and the second region, the plurality of second conductive members being separated from the plurality of first conductive members in the third direction;

a third conductive member connected to the first conductive layer and the second region, a position of the third conductive member in the second direction being between a position of the third region in the second direction and a position of the plurality of first conductive members in the second direction; and a fourth conductive member connected to the first conductive layer and the second region, a position of the fourth conductive member in the second direction being between the position of the third region in the second direction and a position of the plurality of second conductive members in the second direction, the fourth conductive member being separated from the third conductive member in the third direction, a first distance in the third direction between a third center in the third direction of the third conductive member and a fourth center in the third direction of the fourth conductive member being shorter than a second distance in the third direction between a first center in the third direction of one of the plurality of first conductive members and a second center in the third direction of one of the plurality of second conductive members, the third region length being not less than 0.3 times and not more than 0.6 times the second distance, and a length of the third region along the second direction being not less than 0.4 times and not more than 0.6 times the first distance.

16. The circuit according to claim 15, wherein a third distance in the second direction between the third region and a position of a center of the third conductive member in the second direction in the second direction is not less than 0 times and not more than 1/10 times the first distance.

17. The circuit according to claim 15, wherein a direction from a first midpoint in the third direction between the third conductive member and the fourth conductive member to a second midpoint in the third direction between the plurality of first conductive members and the plurality of second conductive members is along the second direction.

18. The circuit according to claim 15, wherein a direction from a first region center in the third direction of the first region to a second region center in the third direction of the second region is along the second direction.

19. The circuit according to claim 15, wherein the first conductive layer, the second region, the plurality of first conductive members, and the plurality of second conductive members are configured to guide a signal with a first wavelength, the first distance is not less than 0.4 times and not more than 0.6 times the first wavelength, and the first wavelength is not more than 15 mm, or the first wavelength is not less than 19 mm and not more than 22 mm.

20. The circuit according to claim 15, wherein the third region includes a first side portion and a second side portion, a direction from the first side portion to the second side portion is along the third direction, and a first angle between the first side portion and the second direction is not less than 0.9 times and not more than 1.1 times a second angle between the second side portion and the second direction.

* * * * *